US007614952B2

(12) United States Patent
Elias

(10) Patent No.: US 7,614,952 B2

(45) Date of Patent: Nov. 10, 2009

(54) GAMING DEVICE HAVING MULTIPLE INTERACTING ROTATORS AND TRANSLATING INDICATOR

(75) Inventor: Hans Elias, Reno, NV (US)

(73) Assignee: IGT, Reno, NV (US)

( * ) Notice: Subject to any disclaimer, the term of this patent is extended or adjusted under 35 U.S.C. 154(b) by 1162 days.

(21) Appl. No.: 10/956,278

(22) Filed: Oct. 1, 2004

(65) Prior Publication Data

US 2006/0084485 A1 Apr. 20, 2006

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/20; 463/30; 463/32; 463/47

(58) Field of Classification Search ............ 463/19–21, 463/30, 32, 47
See application file for complete search history.

(56) References Cited

U.S. PATENT DOCUMENTS 2,545,644 A 3/1951 Benton et al.
3,975,022 A 8/1976 Figueroa
4,410,178 A 10/1983 Partridge
4,695,053 A 9/1987 Vazquez, Jr. et al.
4,732,386 A 3/1988 Rayfiel
5,058,893 A 10/1991 Bertram et al.
5,152,529 A * 10/1992 Okada ......................... 463/20
5,190,495 A * 3/1993 Taxon ......................... 453/32
5,364,100 A 11/1994 Ludlow et al.
5,395,111 A 3/1995 Inoue
5,449,173 A 9/1995 Thomas et al.
5,560,603 A 10/1996 Seelig et al.
5,584,763 A 12/1996 Kelly et al.
5,584,764 A 12/1996 Inoue
5,609,337 A * 3/1997 Clapper, Jr. .............. 273/138.2
5,609,524 A 3/1997 Inoue
5,622,366 A 4/1997 Inoue
5,664,998 A 9/1997 Seelig et al.
5,722,891 A 3/1998 Inoue (Continued)

FOREIGN PATENT DOCUMENTS

EP 1003138 A 5/2000

(Continued)

OTHER PUBLICATIONS

4DU Dice Unit Advertisement written by starpoint.uk.com, printed on Sep. 3, 2002.

(Continued)

*Primary Examiner*—John M Hotaling, II
*Assistant Examiner*—Adetokunbo Torimiro
(74) *Attorney, Agent, or Firm*—K&L Gates LLP

(57) ABSTRACT

A gaming device having an award value or symbol display device is provided. The display device includes multiple interconnecting rotators that cooperate to drive an indicator to produce a translating motion. The translating indicator is positioned along linearly spaced apart award values to sequentially and intermittently indicate or point to various ones of those values and ultimately to one of the values, which has been generated randomly for the player. The value can be awarded to the player or be combined with another value to form an award for the player.

59 Claims, 13 Drawing Sheets

U.S. PATENT DOCUMENTS

| | | | | |
|---|---|---|---|---|
| 5,743,526 | A | 4/1998 | Inoue | |
| 5,752,881 | A | 5/1998 | Inoue | |
| 5,823,872 | A | 10/1998 | Prather et al. | |
| 5,823,874 | A | 10/1998 | Adams et al. | |
| D400,597 | S | 11/1998 | Hedrick et al. | |
| D402,702 | S | 12/1998 | Seelig et al. | |
| 5,848,932 | A | 12/1998 | Adams | |
| 5,863,249 | A | 1/1999 | Inoue | |
| D406,865 | S | 3/1999 | Heidel | |
| 5,882,261 | A | 3/1999 | Adams | |
| 5,885,157 | A | 3/1999 | Harada et al. | |
| 5,911,418 | A | 6/1999 | Adams et al. | |
| 5,927,714 | A | 7/1999 | Kaplan | |
| 5,976,015 | A | 11/1999 | Seelig et al. | |
| 5,984,782 | A | 11/1999 | Inoue | |
| 6,004,207 | A | 12/1999 | Wilson, Jr. et al. | |
| 6,059,658 | A | 5/2000 | Mangano et al. | |
| 6,062,979 | A | 5/2000 | Inoue | |
| 6,086,066 | A | 7/2000 | Takeuchi et al. | |
| 6,089,977 | A | 7/2000 | Bennett | |
| 6,089,978 | A | 7/2000 | Adams et al. | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,159,098 | A | 12/2000 | Slomiany et al. | |
| 6,162,121 | A | 12/2000 | Morro et al. | |
| 6,173,955 | B1 | 1/2001 | Perrie et al. | |
| 6,203,429 | B1 | 3/2001 | Demar et al. | |
| D441,031 | S | 4/2001 | Seelig et al. | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 | 7/2001 | Jaffe | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,315,663 | B1 | 11/2001 | Sakamoto | |
| 6,336,863 | B1 | 1/2002 | Baerlocher et al. | |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,398,220 | B1 | 6/2002 | Inoue | |
| 6,419,579 | B1 | 7/2002 | Bennett et al. | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,660 | B2 | 3/2003 | Seelig et al. | |
| 6,537,152 | B2 | 3/2003 | Seelig et al. | |
| 6,582,307 | B2 | 6/2003 | Webb | |
| 6,609,972 | B2 | 8/2003 | Seelig et al. | |
| 6,712,694 | B1 | 3/2004 | Nordman | |
| 6,715,756 | B2 | 4/2004 | Inoue | |
| 6,974,129 | B2 * | 12/2005 | Nordman | 273/143 R |
| 7,204,754 | B2 * | 4/2007 | Gray et al. | 463/16 |
| 2001/0024971 | A1 | 9/2001 | Brossard | |
| 2002/0094862 | A1 | 7/2002 | Inoue | |
| 2002/0142829 | A1 | 10/2002 | Inoue | |
| 2003/0040358 | A1 | 2/2003 | Rothkranz et al. | |
| 2003/0064790 | A1 * | 4/2003 | Hughs-Baird et al. | 463/20 |
| 2003/0078089 | A1 | 4/2003 | Gray et al. | |
| 2003/0178768 | A1 | 9/2003 | Luciano et al. | |
| 2003/0199311 | A1 | 10/2003 | Webb | |
| 2003/0222401 | A1 | 12/2003 | Kaminkow | |
| 2003/0232643 | A1 | 12/2003 | Inoue | |
| 2004/0000754 | A1 | 1/2004 | Inoue | |
| 2004/0002373 | A1 | 1/2004 | Kaminkow | |
| 2004/0009807 | A1 | 1/2004 | Miller et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0038734 | A1 | 2/2004 | Adams | |
| 2004/0041340 | A1 | 3/2004 | Inoue | |
| 2004/0048645 | A1 | 3/2004 | Webb et al. | |
| 2004/0048649 | A1 | 3/2004 | Peterson et al. | |
| 2004/0048673 | A1 | 3/2004 | Kaminkow | |
| 2004/0053658 | A1 | 3/2004 | Rothranz | |
| 2004/0053659 | A1 | 3/2004 | Rothkranz et al. | |
| 2004/0053660 | A1 | 3/2004 | Webb et al. | |
| 2004/0053663 | A1 | 3/2004 | Paulsen et al. | |
| 2004/0053670 | A1 | 3/2004 | Rothkranz et al. | |
| 2004/0053671 | A1 | 3/2004 | Nordman | |
| 2004/0053687 | A1 | 3/2004 | Nordman et al. | |
| 2004/0082378 | A1 | 4/2004 | Peterson et al. | |
| 2004/0121838 | A1 | 6/2004 | Hughs-Baird et al. | |
| 2004/0121840 | A1 | 6/2004 | Rosander et al. | |
| 2004/0147306 | A1 | 7/2004 | Randall et al. | |
| 2004/0150161 | A1 | 8/2004 | Inoue | |
| 2004/0152498 | A1 | 8/2004 | Kaminkow et al. | |
| 2004/0155399 | A1 | 8/2004 | Inoue | |
| 2004/0157658 | A1 | 8/2004 | Rothkranz | |
| 2004/0171417 | A1 | 9/2004 | Beaulieu et al. | |
| 2004/0171423 | A1 | 9/2004 | Silva et al. | |
| 2004/0180715 | A1 | 9/2004 | Nordman | |
| 2004/0183251 | A1 | 9/2004 | Inoue | |

FOREIGN PATENT DOCUMENTS

| | | | |
|---|---|---|---|
| EP | 1453019 | A2 | 1/2004 |
| GB | 912685 | | 12/1962 |
| GB | 2201821 | A | 9/1987 |
| GB | 2383668 | A | 11/2001 |
| JP | 2002-320703 | | 11/2002 |

OTHER PUBLICATIONS

American Bandstand Brochure written by Anchor Games, published in 2001.

Big Shot!™ Advertisement published by Aristocrat Technologies, Inc., published in 2002.

Big Top Keno Advertisement published by Aristocrat Technologies, Inc., published in 2000.

Bonus Roulette Brochure written by F. Franco, published prior to Sep. 11, 2003.

Buck's Roulette Brochure written by R. Franco, published prior to Sep. 11, 2003.

Chariot's of Fortune Brochure written by R. Franco, published prior to Sep. 11, 2003.

Classic Pot of Gold Brochure written by Ace Coin Equipment Ltd., published prior to Sep. 11, 2003.

Cyberdyne Gaming Brochure written by Cyberdyne Gaming, published prior to Sep. 11, 2003.

Double Diamond Girls Advertisement, written by A.C. Coin and Slot Services Company, published prior to Sep. 11, 2003.

Elvira® Mistress of the Dark™ Advertisement written by IGT, published in 2002.

Elvis Hits Advertisement written by IGT, published in 1999.

Holy Smoke Brochure written by Impulse Gaming Ltd., published prior to Sep. 11, 2003.

Honeymooners Advertisement, written by AC Coin & Slot, published in 2002.

Jack and the Beanstalk™ Brochure written by AC Coin & Slot, published prior to Sep. 11, 2003.

Jackpot Hotline Advertisement, written by AC Coin and Slot, published prior to Sep. 11, 2003.

King of the Grill™ Brochure written by AC Coin & Slot, published prior to Sep. 11, 2003.
Lemons, Cherries and Bell-Fruit-Gum written by Richard M. Bueschel, pp. 39-41, 64, 70, 137, 149-150, 195-196 and 251, 1995.
Line-Up Brochure written by AC Coin & Slot, published prior to Sep. 11, 2003.
Little Green Men Jr.™ Advertisement written by AC Coin & Slot, published prior to Sep. 11, 2003.
Little Green Men Jr.™ Article written by Strictly Slots, published in Feb. 2003.
Miss America Brochure written by AC Coin & Slot, published prior to Sep. 11, 2003.
Mix and Match Article written by Strictly Slots, published in Apr. 2002.
Mix and Match Advertisement published by AC Coin & Slot, published prior to Sep. 11, 2003.
Money Grab Article written by Strictly Slots, published in Apr. 2001.
Monster Match Game Description by Strictly Slots, published by AC Coin & Slots prior to Sep. 9, 2003.
Monster Match Advertisement by Strictly Slots, published prior to Sep. 9, 2003.
Monster Match Article, published by Strictly Slots, published in Jan. 2002.
On The Money! Article written by Strictly Slots, published in Dec. 2000.
Payout!™ Advertisement written by www.csds.com/Gaming/Products/g Payout.htm, printed on Jan. 15, 2001.
Payout!™ Article written by Casino Data Systems, published prior to Sep. 11, 2003.
Pick a Prize Brochure written by Acres Gaming Incorporated, published prior to 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, published prior to Sep. 11, 2003.
Reel Dice Advertisement written by Gerber & Glass, published in 1936.
Royal Roulette Brochure written by Impulse Gaming Ltd., published prior to Sep. 11, 2003.
Slot Machine Buyer's Handbook, A Consumer's Guide to Slot Machines written by David L. Saul and Daniel R. Mead, published in 1998.
Silver City Roundup Brochure published by AC Coin & Slot, published prior to Sep. 11, 2003.
Slot Machines A Pictorial History of the First 100 Years, $5^{th}$ edition written by Marshall Fey, published in 1983-1997.
Slot Machines and Coin-Op Games written by Bill Kurtz, pp. 16, 65, 105 and 111, 1991.
Slot Machines on Parade, $1^{st}$ edition written by Robert N. Geddes and illustrated by Daniel R. Mead, published in 1980.
Spin-A-Lot Brochure written by Acres Gaming Incorporated, published prior to 2001.
Take Your Pick Article written by Strictly Slots, published in Mar. 2001.
Yahtzee Bonus Advertisement written by Mikohn, published in 1999.

* cited by examiner

GAMING DEVICE HAVING MULTIPLE INTERACTING ROTATORS AND TRANSLATING INDICATOR

BACKGROUND OF THE INVENTION

The present invention relates to gaming devices and more particularly to a display for a wagering gaming device having multiple rotating members and an indicator caused to move transversely by the interaction of the members.

Gaming devices, such as slot machines and video poker machines, provide fun and excitement to the player. Gaming, in general, provides an escape from the everyday rigors of life. Gaming devices use bright lights and exciting sounds to have the gaming machines stand out from other gaming machines. Gaming devices, in particular, use one or more displays that enable the player to see and play the game. The displays typically portray the action of the game and ultimately indicate whether or not the player wins and how much the player wins.

Slot machine and other gaming device displays have gone through a number of transitions since their inception. Originally, slot machines displayed purely mechanical reels. While these machines gained enormous popularity, the mechanical nature of the reels limited the number of paystops, which limited the number of different symbols and the number of different winning symbol combinations.

The advent of the computer and the video monitor expanded the possibilities for gaming devices. There are now video poker, video blackjack and other types of video gaming machines. Video displays have also been implemented in slot machines. The video slot machines use computers to randomly generate symbol combinations from an expanded number of different symbols. Video reel strips can include a virtually unlimited number of symbols, which enable a wide variety of different symbol combinations to be employed, including combinations that appear very infrequently and yield high payouts.

With slot machines, the video monitors have also been used to provide bonus or secondary games. Bonus games in gaming machines have become much more prevalent and elaborate in recent years. For example, players play the base game of slot until becoming eligible for a bonus game. The base game temporarily pauses, while the player plays the bonus game. When the player completes the bonus game, the gaming device returns the player to the base game.

A single video monitor is often sufficient to provide both the base game of slot and one or more bonus games that become triggered by the slot game. As illustrated in FIGS. 1A and 1B, however, there is room on the cabinet of gaming device 10 for an upper display area 32. That area is often not utilized for gaming purposes and may simply provide a paytable, graphics and/or lettering that pertains to a theme of the gaming device.

Video monitors and in particular video-based slot machines are likely going to continue growing in popularity. As the video monitor has been used more and more, however, there has been a growing sentiment that some of the mystique of the old time mechanical gaming devices is lost when mechanical reels and mechanical displays are replaced by a video monitor.

Accordingly, a need exists to provide a gaming device that may use a video monitor, which provides increased flexibility to the gaming device to add more symbols and more elaborate bonus games, while providing some aspect of the gaming device that is mechanical and provides a fun and exciting mechanical display.

SUMMARY OF THE INVENTION

The present invention provides a display device for a gaming device and in one embodiment an electromechanical display device for a wagering gaming device such as a slot machine. As discussed below, the display device ultimately shows an indicator, such as an arrow, which appears to float in a unique and interesting way across or adjacent to one or more award displays. During the motion, the indicator individually points to or indicates multiple ones of the award values or other symbols or outcomes displayed by the award or symbol display(s). The player views the motion of the indicator, sees the multiple award value indications and hopes to ultimately receive the highest or relatively a large or high-valued award versus a relatively small or low-valued award.

The display device is operable in a primary or base game or as part of a bonus or secondary game played in conjunction with a primary or base game. In one embodiment, the display device resides on an upper panel or top box of a slot machine, located above the slot machine reels. The display device can follow a theme of the slot machine. However, the display device is not limited to any one particular theme and is adaptable for multiple different themes.

The display device is electrochemical in one preferred embodiment but can alternatively be simulated on a video monitor. The display device includes a plurality of interacting members such as interlocking gears or rotators. In one embodiment, one of the gears or rotators is driven, e.g., by an accurately positionable motion producing device, such as a stepper motor. The driven gear or rotator is generally circular in one embodiment and has an outer diameter with outer facing gear teeth or other suitable surface that frictionally engage an inner diameter or inwardly facing gear teeth or other suitable surface of a second ring-shaped or planetary gear or rotator. The ring-shaped or planetary rotator therefore rotates about the driven rotator when the driven rotator is driven.

The ring-shaped rotator may be held in place by the frame or other structure of gaming device 10. The holding structure contacts the outer circular surface of the ring-shaped rotator via suitable bearings, such as roller or ball bearings. Alternatively, a shaft extends through the driven rotator and is coupled to the motor shaft. The shaft through the driven rotator is fixed rotatably to the frame of the machine via suitable bearings and pillow blocks. That mounting in combination with the stationary member also holds the indicating rotator and associated indicator rotatably in place. A third or indicating rotator is rotatably connected to the ring-shaped or planetary second rotator. The point at which the third or indicating rotator is coupled to the ring-shaped rotator is at a radial distance or offset distance from the center of the drive shaft of the motor. The offset distance cooperates in producing the desired cyclic motion of an indicator or arrow that is coupled to and rotates with the third or indicating rotator.

The third or indicating rotator is generally circular in one embodiment, like the first rotator. The third or indicating rotator defines an outer diameter, which may have outwardly facing gear teeth or other suitable surface, wherein the outer diameter frictionally engages an inner surface of an inner diameter of a stationary member, which may have inwardly facing gear teeth or other suitable surface.

The above-described configuration causes the indicating rotator, when the ring-shaped rotator is rotated by the driven rotator, to rotate about a circumference defined by the contact or connection point between the driven and ring-shaped rotators relative to an axis of rotation of the second ring-shaped or planetary rotator. Also, the stationary member causes the indicating rotator to rotate simultaneously about its rotatable connection with the ring-shaped rotator. The motion of the indicating rotator is accordingly complex and multi-faceted.

An indicator is connected to the rotatable connection between the ring-shaped and indicating rotators and follows the complex movement of the indicating rotator. The indicator in one embodiment includes an arrow with an arrowhead or other suitable indicating end or member. The resulting motion of the indicating end due to the interlocking motions of the first, second and third rotators in combination with the stationary member strikes an elongated loop, similar to the shape of a popsicle stick. The two sides of the loop are substantially linear. Two 180 degree turns occur, one at each end of the loop, near the stationary number.

A stepper motor is coupled to and rotates the driven rotator in one embodiment. A motion control program is stored in memory. The stepper motor operates according to the program to vary angular acceleration and velocity as well as the total number of revolutions of the driven rotator as desired by the game implementer. The stepper motor and gears move an indication portion of the indicator in an elongated loop. Outcomes such as award values are positioned in one embodiment along the sides of the elongated loop. Outcomes such as award values are positioned in one embodiment along the sides of the elongated loop. While the driven rotator is rotated, the indicating portion of the indicator linked to the driven rotator translates along award values or symbols displayed to the player. In one embodiment the rows of award values or symbols are displayed, one for each side of the elongated loop struck by the motion of the indicating portion.

The elongated rows can be vertically disposed, horizontally disposed or disposed at any desired angle with respect to a center point of the diameter of the stationery number. Ultimately, the indicating portion of the indicator stops and points to or otherwise indicates one of the award values for the player.

The indicator indicates one of the award values or symbols in one of a variety of ways. In one way, the indicator encloses an open area around the indicated or selected award value. The open area enables the player to see the value. To that end, the indicator can house a viewing glass or clear plastic piece. In another embodiment, the indicator points to or stops next to the selected value. Here, the indicator includes a pointed end or indicating end that points to the award value. The ultimate award provided to the player can be the indicated award value or be based on the indicated award value. After the gaming device provides the award to the player, the game ends or the player returns to the base game depending on the role of the display device within the gaming device.

In an alternative embodiment the driven gear or rotator and the ring-shaped or planetary gear or rotator are combined into one rotator. Here, the motor couples to the alternative rotator at a centerpoint of the alternative rotator. The alternative rotator is coupled to the indicating rotator at a distance offset from the centerpoint of the alternative rotator. The indicating rotator as before is engaged functionally with a stationary member. The offset coupling and a force applied by the stationary member contribute to an overall desired cyclic motion of the indicating member and an arrow or indicator connected to the indicating member.

It is therefore an advantage of the present invention to provide a fun and interesting gaming device display.

It is another advantage of the present invention to provide a fun and interesting apparatus and method for designating an award or award portion for a player.

It is a further advantage of the present invention to provide a display device that operates with a primary or bonus game.

It is still another advantage of the present invention to provide a display device having multiple rotating members that cooperate to move an end of a indicator in a substantially translational manner, and wherein such translational motion is well-suited to indicate one of a plurality of linearly arranged award values or symbols.

Additional features and advantages of the present invention are described in, and will be apparent from, the following Detailed Description of the Invention and the figures.

DETAILED DESCRIPTION OF THE INVENTION

The present invention provides a display device that operates with a primary or base wagering game, including but not limited to the games of slot, poker, keno, blackjack, craps and bunco. In an embodiment, the display device operates in conjunction with a secondary or bonus game, which in turn operates in conjunction with the above-listed primary games. Besides such base and bonus games, the present invention can operate with any of the bonus triggering events, as well as any progressive game coordinating with those base games. The symbols and indicia used for any of the primary or base games, bonus or secondary games or progressive games include any suitable symbols, images or indicia.

Figure 1A:
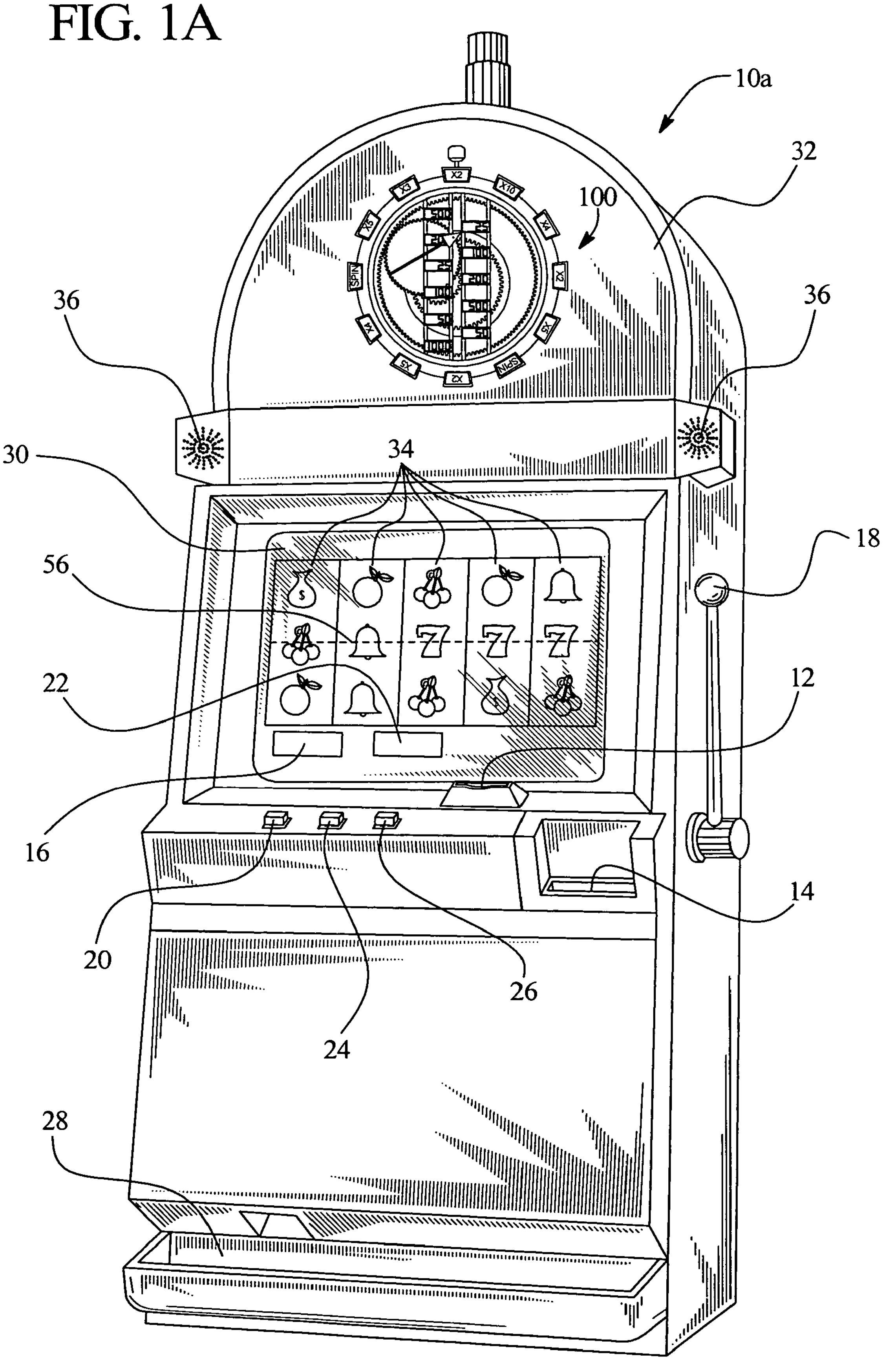
FIGS. 1A and 1B are perspective views of alternative embodiments of the gaming device of the present invention.
Figure 1B:
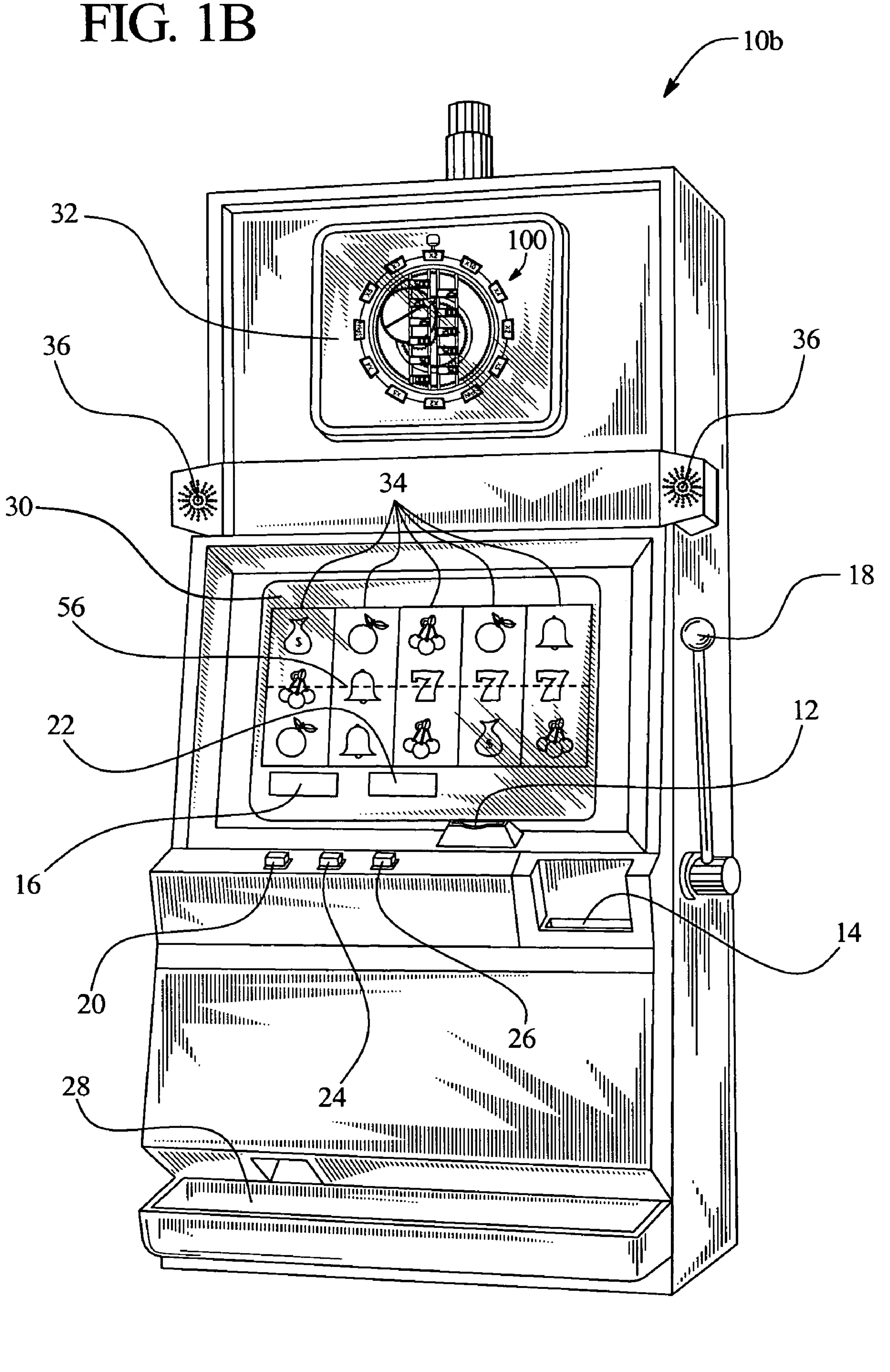

One primary embodiment for the multiple rotating members or gears (referred to herein as rotators) and translating indicator of the present invention is with a slot game. Referring now to the drawings, and in particular to FIGS. 1A and 1B, one slot machine embodiment is illustrated. Gaming devices 10*a* and 10*b* illustrate two possible cabinet styles and display arrangements and are collectively referred to herein as gaming device 10. Gaming device 10 is illustrated as having the controls, displays and features of a conventional slot machine, wherein the player operates the gaming device while standing or sitting. Gaming device 10 can also be a pub-style or table-top game (not shown) for which a player operates while sitting.

Gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player increases the bet by one credit each time the player pushes the bet one button 24. When the player pushes the bet one button 24, the number of credits shown in the credit display 16 decreases by one, and the number of credits shown in the bet display 22 increases by one. A player cashes out by pushing a cash out button 26 to receive coins or tokens in the coin payout tray 28 or to receive other forms of payment, such as an amount printed on a ticket or credited to a credit card, debit card or smart card. Well known ticket printing and card reading machines (not illustrated) are commercially available.

Gaming device 10 also includes one or more display devices. The embodiments shown in FIGS. 1A and 1B include a display device 30 and a cabinet having an upper display area 32. The display device 30 includes any viewing surface, such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The multiple interlocking rotators and moving indicator of display device 100, including a translating indicating portion, are provided in one embodiment in the upper display area 32 of the cabinets of gaming devices 10*a* and 10*b* of FIGS. 1A and 1B. Display devices 100 in gaming devices 10*a* and 10*b* of FIGS. 1A and 1B are both located in the top box areas of the respective cabinets. Display device 100 is alternatively provided as a replacement for a top box area or on top of the gaming devices above the top box and upper display area 32.

The slot machine embodiment of gaming device 10 includes a plurality of reels 34, for example three to five reels 34. Each reel 34 includes a plurality of indicia such as bells, hearts, fruits, numbers, letters, bars or other images which correspond to a theme associated with gaming device 10. If the reels 34 are in video form, the display device displaying the video reels 34 is, in one embodiment, a video monitor. Gaming device 10 includes speakers 36 for making sounds or playing music.

With reference to the slot machine base game of FIGS. 1A and 1B, to operate gaming device 10, the player inserts the appropriate amount of tokens or money in a coin slot 12 or a payment acceptor 14 and then pulls arm 18 or pushes play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, gaming device 10, including any of the base games disclosed above, also includes bonus games that give players the opportunity to win credits. Gaming device 10 can employ a video-based display device 30 for the bonus games. The bonus games include a program that automatically begins when the player achieves a qualifying condition in the base game. The bonus game is also operated, in one embodiment, at least in part via display device 100. Display device 100 in an alternative embodiment provides a stand alone game and not a bonus game based on a base game.

Figure 2:
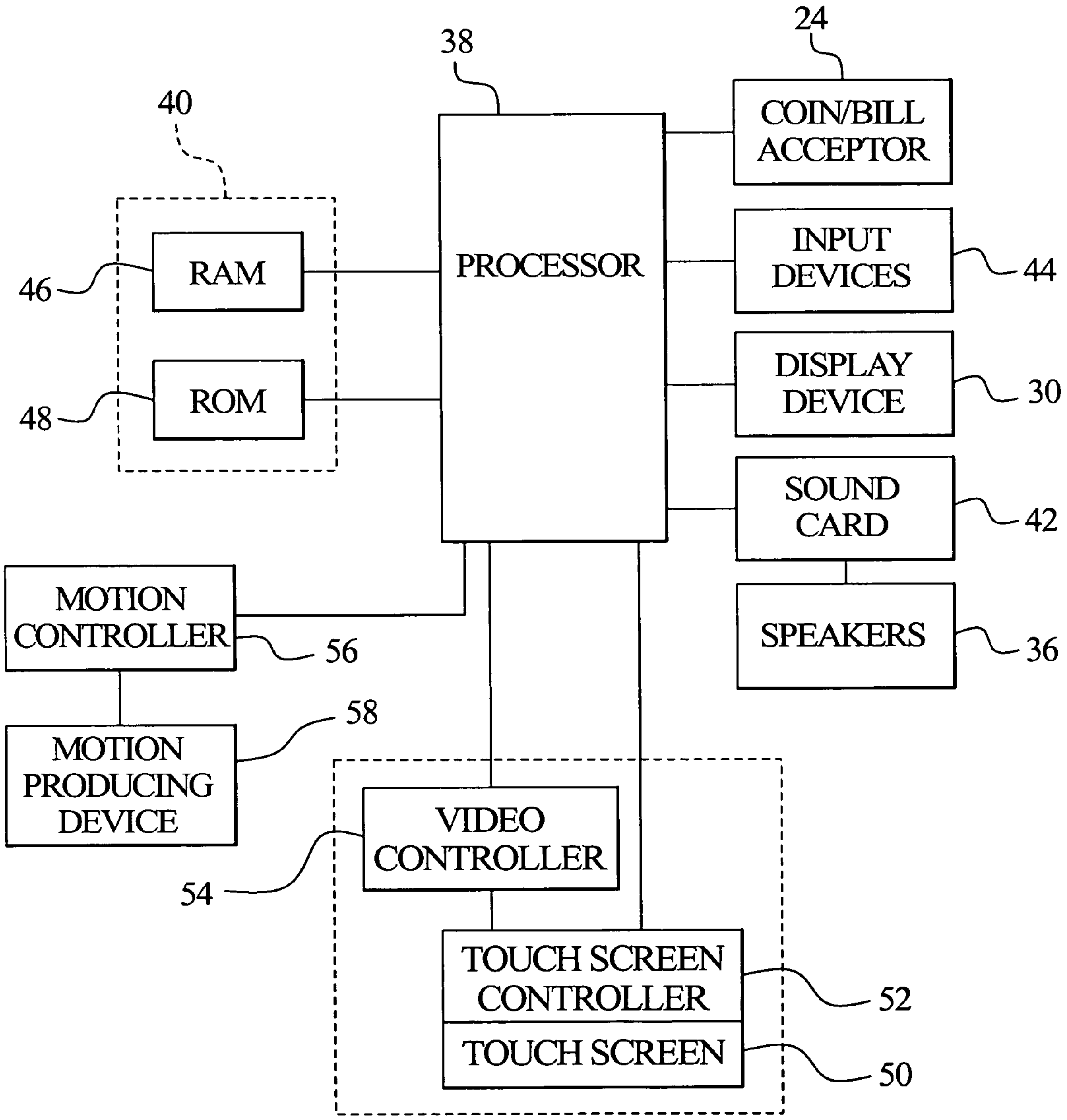
FIG. 2 is a schematic block diagram of the electronic configuration of one embodiment of the gaming device of the present invention.

Referring now to FIG. 2, one embodiment of an electronic configuration for gaming device 10 includes: a processor 38, a memory device 40 for storing program code or other data, a display device 30, a sound card 42, a plurality of speakers 36, and one or more input devices 44. The processor 38 is a microprocessor based platform that is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include pull arm 18, play button 20, the bet one button 24, the cash out button 26 and other player inputs. A touch screen 50 and touch screen controller 52 are connected to a video controller 54 and processor 38. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

Processor 38 also controls the output of one of more motion controllers 56 that control one or more motion producing devices 58. The motion producing devices 58 can be any combination of motors, such as stepper motors, servo motors, AC/DC motors or any other type of device that outputs a rotating member. The motion controller 56 typically includes printed circuit boards or stand alone enclosures that receive high level commands from the processor 38. The motion controller 56 converts the high level commands, for example, into a number of step pulses, which in turn are converted into motor currents. The stepper motor or other type of motion producing device 58 receives the currents, wherein the currents cause, for example, a rotor to turn within a stator a precise and desired amount.

The controllers 56 and motion devices 58 produce a motion control scheme that can include complex movements of multiple parts. That scheme is programmed into the memory device 40 and carried out by the processor 38 at the appropriate time in the sequence of the game, be it a stand alone, base, bonus, bonus triggering or progressive sequence of gaming device 10. Moreover, multiple programs can be stored, recalled or implemented in the memory device 40. Processor 38 runs the appropriate program at the appropriate time, wherein the multiple rotators and translating indicator described in more detail below move as programmed. The motion control programs, in one embodiment, interface with one or more random generation devices, typically software based items, to produce randomly displayed outcomes on the display device 100, which can be a combination of multiple random generations as seen below.

Figure 3:
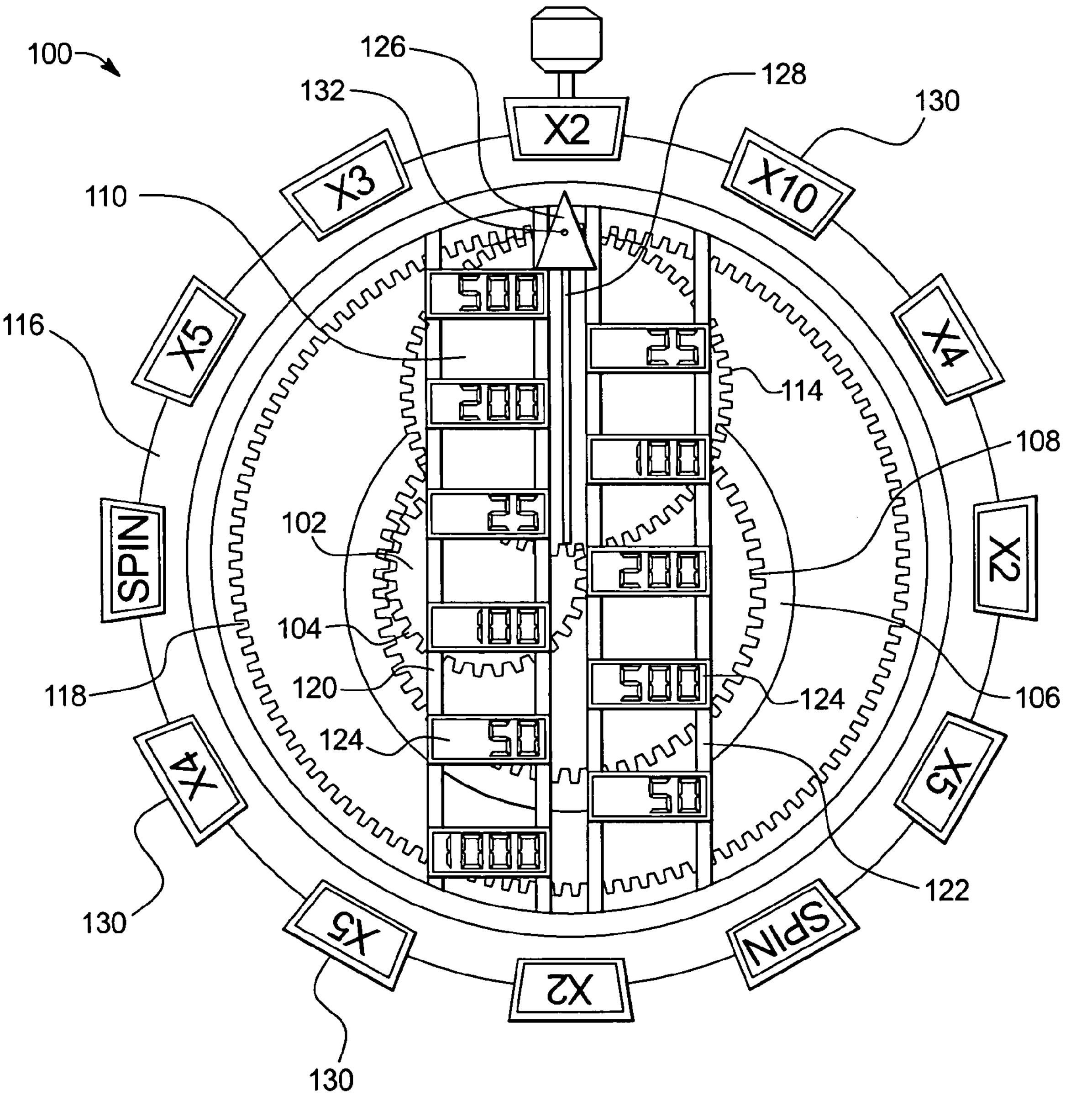
FIGS. 3, 4, 5, 6, 7, 8, 9 and 10 are front elevation views of the upper display area of the gaming device shown in FIGS. 1A and 1B, illustrating one embodiment of the multiple interlocking rotators and the translating indicator of the present invention.
Figure 11:
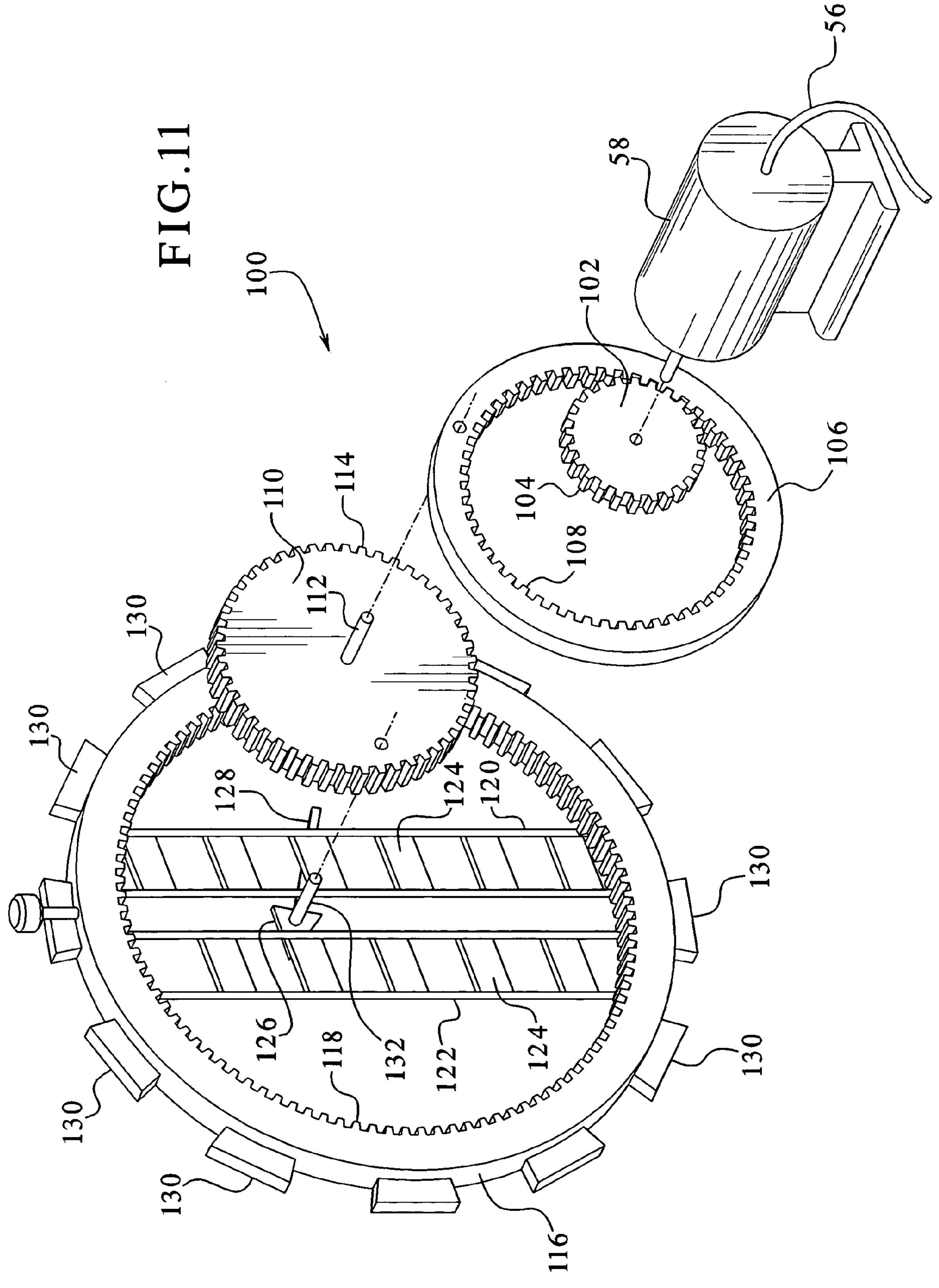
FIG. 11 is an exploded perspective view further illustrating the interlocking relationship between the multiple interlocking rotators and the translating indicator of the present invention.

Referring now to FIGS. 3 and 11, one embodiment of the present invention is illustrated as display device 100. Display device 100 is located in one embodiment in the upper display area 32 shown in FIG. 1A. Display device 100 includes an apparatus which can be simulated on a video monitor or, in one preferred embodiment, an electromechanical device. That is, upper display area 32 in one embodiment is a video monitor. In that situation, the video monitor 32 can operate with a touch screen, such as touch screen 50, which operates with a touch screen controller, such as controller 52. When display device 100 is simulated, each of the motions described below occurs on the video monitor in a simulated format.

In one preferred embodiment, display device 100 is electromechanical and includes mechanical apparatus such as the apparatus which will now be described. In one embodiment, display device 100 includes a driven or first gear or rotator 102. First rotator 102 is alternatively referred to as the driven rotator. Driven rotator 102 encompasses multiple embodiments, wherein the rotator is either a gear having outwardly extending teeth 104 or a frictional member, that frictionally engages a second frictional member 106, such as a pulley, disk, wheel, etc. Second rotator 106 is alternatively a gear having inward facing gear teeth 108 that engage outward facing gear teeth 104. Because rotator 106 is generally ring-shaped in one embodiment, rotator 106 is referred to herein as a ring-shaped rotator or planetary rotator for ease of illustration.

Second or ring-shaped rotator 106 is housed in one embodiment inside of a frame or other structure (not illustrated) of gaming device 10. The housing contacts the outer circular surface of the ring-shaped rotator 106 via suitable bearings, such as roller or ball bearings. The housing holds or houses ring-shaped rotator 106 in a desired three-dimensional position. The roller or ball bearings however enable the driven rotator 102 to rotate the ring-shaped rotator 106 within the housing.

In an alternative embodiment, a separate shaft (not illustrated) extends through driven rotator 102 and is coupled to the shaft of motion producing device 58 via a suitable coupler. The shaft extending through rotator 102 is coupled rotatably via suitable bearings and pillow blocks to the frame or other mounting structure of gaming device 10. That mounting holds driven rotator 102, ring-shaped rotator 106, indicating rotator 110 and indicator 128 rotatably in place. Indicating rotator 110 is also confined by stationary member of wheel 116.

Rotators 102 and 106 rotate in the same direction relative to an axis extending transversely from the panel of upper display area 32. That is, as rotators 102 and 106 are seen in FIGS. 3 and 11, if driven rotator 102 is driven counterclockwise, ring-shaped rotator 106 will, in turn, be driven counterclockwise. Likewise, if rotator 102 is driven clockwise, rotator 106 is also driven clockwise. It should be appreciated that rotators 102 and 106 rotate about a fixed axis and do not in the illustrated embodiment translate horizontally or vertically with respect to the panel of upper display area 32. It should also be appreciated that while rotator 106 is ring-shaped or planetary in nature, rotator 102 is primarily disk-shaped in one embodiment. As seen, the outside of driven rotator 102 drives the inside of ring-shaped rotator 106. That driving connection can be produced via teeth 104 and 108, respectively, or via a frictional arrangement.

A third rotator 110 pivots about pivot point 112 (See FIG. 11), which is a mechanical connection extending toward the side of ring-shaped or planetary rotator 106. Thus, while ring-shaped rotator 106 is rotated by driven rotator 102, third rotator 110 is also carried about the circumference defined by pivot 112 at the radius extending from the center point of ring or rotator 106 to pivot point 112. As discussed below, third rotator 110 is connected to an indicator. For purposes of illustration, third rotator 110 is referred to herein as an indicating rotator. The travel of indicating rotator 110 about the circumference struck by pivot 112 occurs in the same direction of rotation of ring-shaped or planetary rotator 106, which in turn rotates in the same direction as driven rotator 102. Thus, if rotator 102 rotates counterclockwise, the ring-shaped rotator 106 also rotates counterclockwise as does the first rotational movement of indicating rotator 110 about the circumference struck by pivot 112 about the center of ring-shaped or planetary rotator 106.

Indicating rotator 110 also defines or includes outwardly extending teeth 114 as illustrated. Display device 100 also includes a fourth member 116 that is stationary. That is, stationary member 116 does not rotate or translate with respect to the panel of upper display area 32.

Stationary member 116 defines inwardly extending gear teeth 118 as illustrated. Inwardly extending gear teeth 118 interact with outwardly extending gear teeth 114 of indicating rotator 110. In an alternative embodiment, gear teeth 114 and 118 are not provided and indicating rotator 110 and fixed member 116 are otherwise frictionally engaged with one another. It should be appreciated that in the embodiments where two mating rotators or rotator and member are frictionally engaged, the engaging surfaces of such rotators and member in one embodiment are coated or otherwise provided with a friction increasing surface, such as a rubber surface, plastic surface or other surface which has been roughened to increase contact friction with a mating surface.

Indicating member 110 undergoes two types of rotation. One type of rotation has been described previously. In that rotation, indicating rotator 110 rotates about the circumference struck by pivot 112. That rotation can be termed a major orbit. In that context, indicating rotator 110 also rotates about pivot 112 as it is rotating about the center of ring-shaped rotator 106. The rotation about pivot 112 can be said to be a minor axis or rotation. The rotation about pivot 112 is caused by the pivotal connection to the ring-shaped or planetary rotator 106, which is rotating and the frictional engagement between indicating rotator 110 and stationary member 116. The direction of rotation of indicating member 110 about pivot 112 is opposite to the direction of driven rotator 102, the ring-shaped rotator 106 and the major orbit of indicating rotator 110. In short, if as they are seen on display panel 32 of FIGS. 3 and 11, driven rotator 102 is caused to rotate in a counterclockwise direction, the indicating rotator 110 is caused to rotate in a clockwise direction. Further, if driven rotator 102 is driven to rotate in a clockwise direction, indicating rotator 110 is caused to rotate about pivot 112 in a counterclockwise direction.

Display device 100 also includes an award value display 120 and an award value display 122, each displaying a plurality of award values 124. Award values 124 are illustrated as being credit values, however, the award values can represent many different types of award values. For example, besides game credits, award values or symbols 124 can represent game credit multipliers, a number of free spins, a number of free games, a number of picks from a prize pool, a non-monetary award such as food, drink, casino service items, casino merchandise, merchandise outside of the casino, services outside of the casino and any combination thereof. That is, certain award values or symbols 124 can be of a first type while others are of a second type.

Displays 120 and 122 are illustrated as vertical lines of award values 124. As illustrated below, displays 120 and 122 are set apart enough for an indicating portion 126 of an indicator 128 to traverse vertically up and down along award value displays 120 and 122. In an alternative embodiment, the entire display device 100 can be rotated 90 degrees, so that the indicating portion 126 of indicator 128 traverses substantially horizontally as opposed to substantially vertically. Alternatively, display device 100 can be rotated to any possible degree so that indicating portion 126 translates at any desired angle.

Display device 100 also includes a plurality of secondary award values or symbols 130, which are illustrated as multipliers and spin values. Secondary award values 130 can be of any type described above for award values 124. In one embodiment, award values or symbols 124 and 130 are each generated, e.g., randomly, for the player and combined to form an overall award for the player. The secondary award values 130 can be illustrated as being provided to the player via a light that lights up a generated value 130 or through other suitable, e.g., random, identification apparatus.

Indicator 128 pivots with indicating rotator 110 in the illustrated embodiment. The indicator 128 is fixed to indicating rotator 110 and rotates in one embodiment in a one-to-one relationship with rotator 110. Indicator 128 is attached in one embodiment to indicating rotator 110 at a point 132. Viewing FIGS. 3 to 10, point 132 does not intersect structures 120 and 122 as display device 100 is operated. That configuration enables rotators 102, 106 and 110 to reside behind award indicating structures 120 and 122, while indicator 128 and head 126 reside in front of structures 120 and 122. Rotators 102, 106 and 110 are visible to the player in one embodiment. In an alternative embodiment, the rotators are hidden so that indicator 128 appears to float, move in a very interesting manner and eventually indicate an award value or symbol for the player.

FIG. 3 illustrates indicator 128 and indicating portion thereof 126 in an initial position. FIGS. 4 to 10 illustrate display device 100 at various points in time in a motion sequence, showing the path defined by indicator 128 and indicating portion 126. FIG. 11 is an exploded view of display device 100 illustrating further the interconnection of rotators 102, 106 and 110 and stationary member 116.

Figure 4:
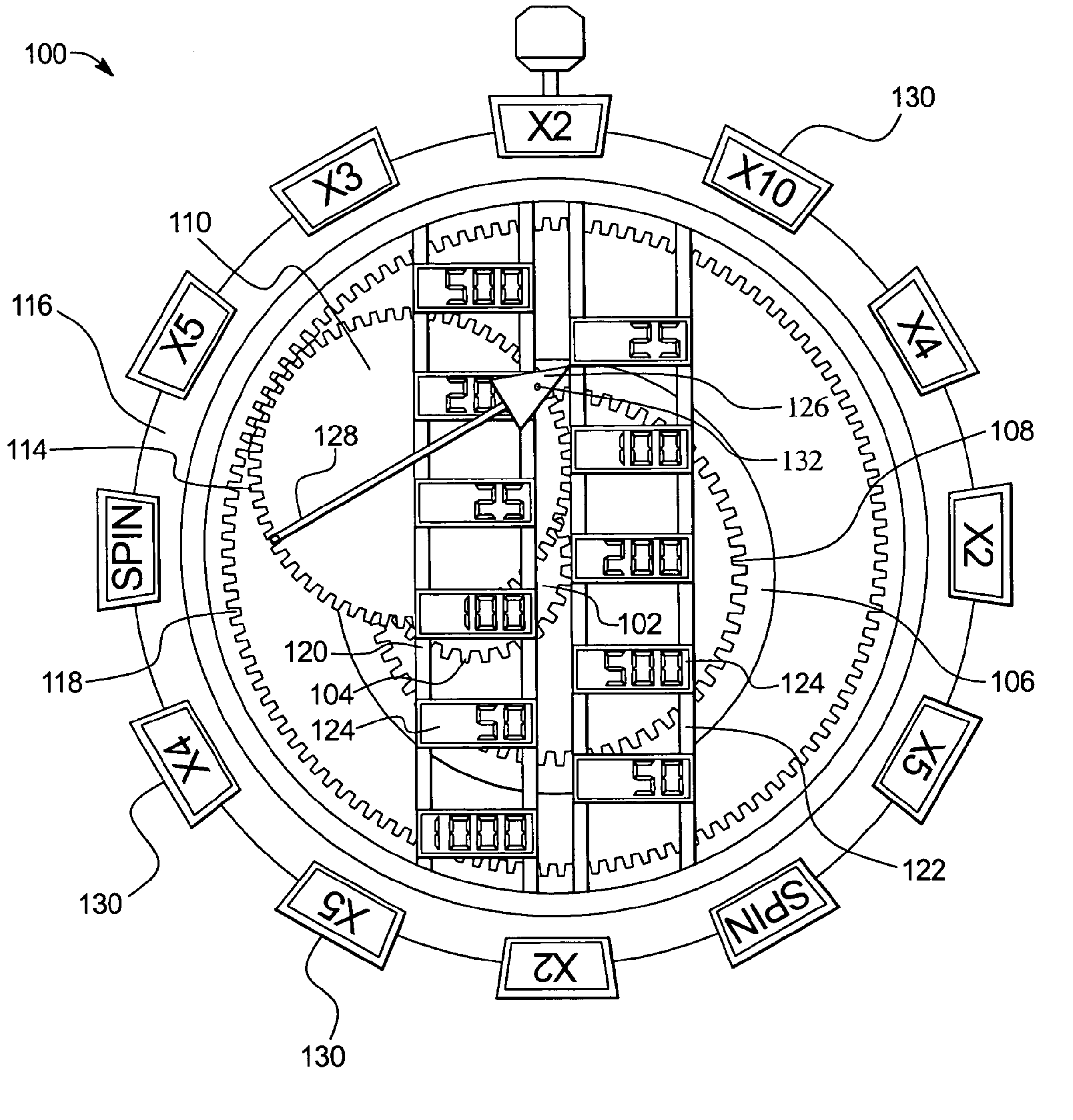

FIG. 4 illustrates the apparatus of display device 100 after driven rotator 102 has been rotated slightly in a counterclockwise direction as seen in the orientation of FIG. 4. That slight counterclockwise rotation in turn pulls secondary ring-shaped or planetary rotator 106 a slight amount in the counterclockwise direction. That movement in turn pulls indicating rotator 110 in the same counterclockwise direction a same amount via the connection of ring-shaped rotator 106 to indicating rotator 110 via pivot 112. At the same time, indicating rotator 110 rotates slightly in a clockwise direction as indicated by indicator 128 and indicating portion 126 thereof. The clockwise rotation is caused by the motion of indicating rotator 110 about the center of ring-shaped or planetary rotator 106 and by the engagement of indicating rotator 110 and stationary member 116.

Viewing indicating portion 126 in both FIGS. 3 and 4, the arrowhead or indicating portion 126 has rotated horizontally slightly from the center position in FIG. 3 to touch or cover a portion of indicating structure 122. The majority of the motion, however, is translationally downward. Indeed, as indicating rotator 110 begins to rotate in FIG. 3, an arc is struck by head 126 until reaching the portion of award value structure 122, thereafter head 126 moves substantially straight downward to, as seen, the award value 124 of twenty-five. If the motion of display device 100 were to stop at the instant shown in FIG. 4, the player could be awarded twenty-five credits or an award based on the value of twenty-five.

Figure 5:
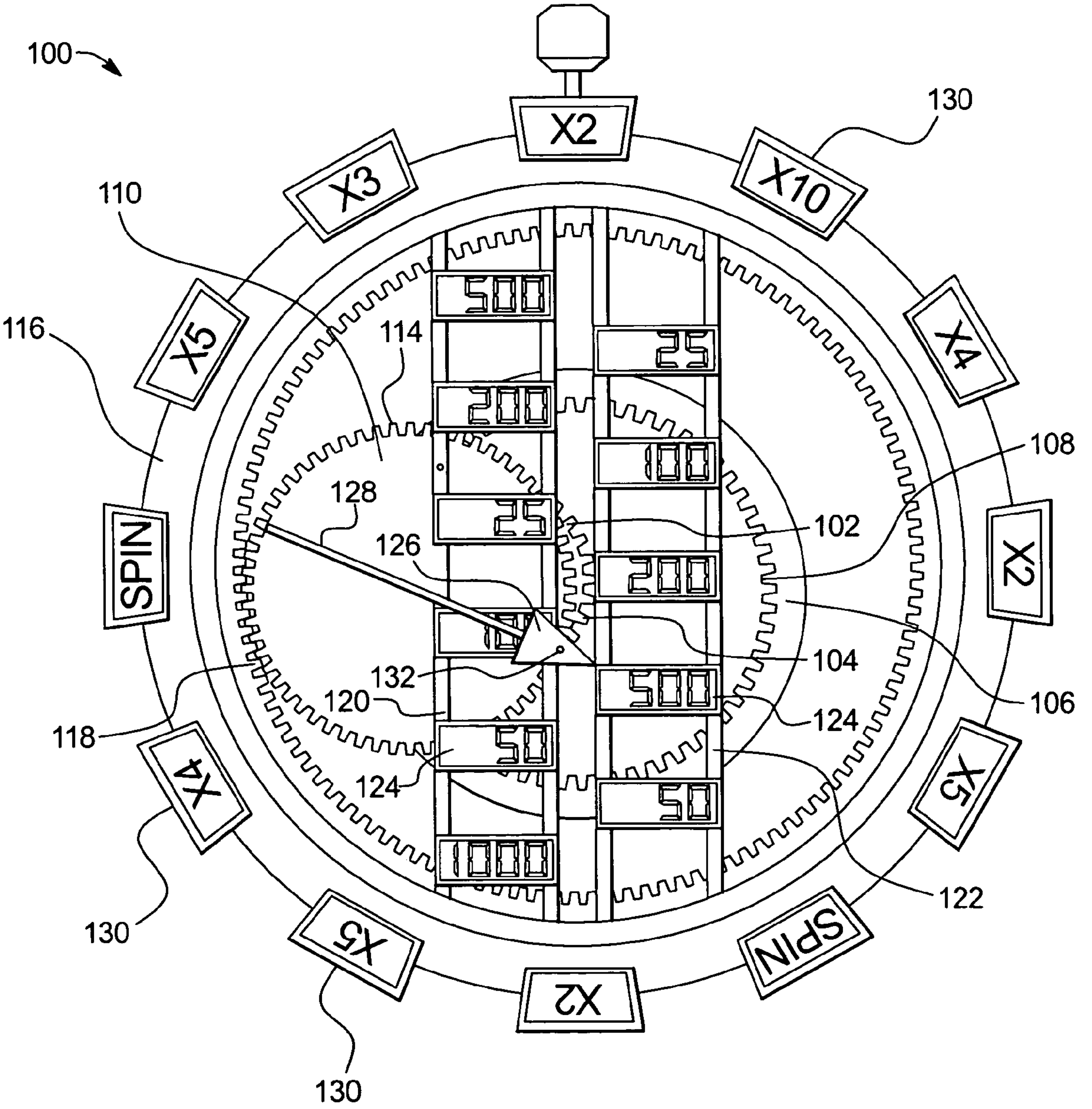

FIG. 5 illustrates indicator 128 and indicating portion thereof 126 in a position moved from the position seen in FIG. 4 after driven indicator 102 has been rotated slightly further in a counterclockwise direction as seen from the orientation of FIG. 5. That slight counterclockwise rotation in turn pulls ring-shaped or planetary rotator 106 a slight amount in the same counterclockwise direction. The movement in turn pulls indicating rotator 110 in the same counterclockwise direction a same amount via the connection of ring-shaped rotator 106 to indicating rotator 110 via pivot 112. At the same time, indicating rotator 110 rotates slightly in a clockwise direction as indicated by indicator 128 and indicating portion 126 thereof. The clockwise rotation is caused by the motion of indicating rotator 110 about the center of ring-shaped or planetary rotator 106 and by the engagement of indicating rotator 110 and stationary member 116.

Viewing indicating portion 126 in both FIGS. 3 and 4, the arrowhead or indicating portion 126 has rotated substantially translationally downward. That is, the rotational motion of rotators 102, 106 and 110 in combination with the force delivered by stationary member or wheel 116 is converted to a substantially translational motion for the endpoint of head 126 and between FIGS. 4 and 5. If the motion of display device 100 were to stop at the instant shown in FIG. 5, the player could be awarded five hundred credits or an award based on the value of five hundred, e.g., multiplied by a multiplier value 130.

Figure 6:
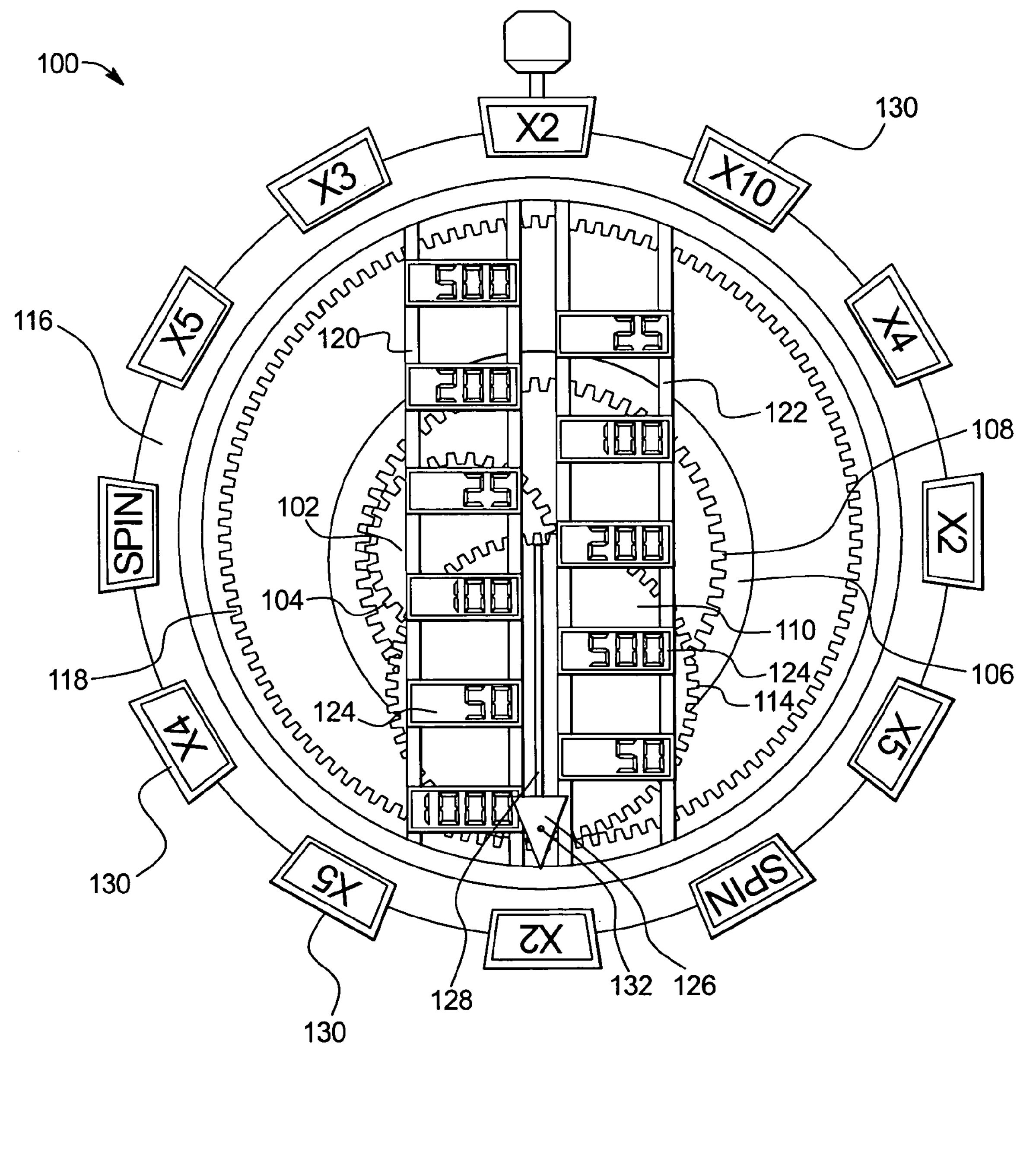

FIG. 6 illustrates indicator 128 and indicating portion thereof 126 in a position moved from the position seen in FIG. 5 after driven indicator 102 has been rotated slightly further in a counterclockwise direction as seen from the orientation of FIG. 6. That slight counterclockwise rotation in turn pulls ring-shaped or planetary rotator 106 a slight amount in the same counterclockwise direction. The movement in turn pulls indicating rotator 110 in the same counterclockwise direction a same amount via the connection of ring-shaped rotator 106 to indicating rotator 110 via pivot 112. At the same time, indicating rotator 110 rotates slightly in a clockwise direction as indicated by indicator 128 and indicating portion 126 thereof. The clockwise rotation is caused by the motion of indicating rotator 110 about the center of ring-shaped or planetary rotator 106 and by the engagement of indicating rotator 110 and stationary member 116.

Viewing indicating portion 126 of indicator 128 in both FIGS. 5 and 6, the arrowhead or indicating portion 126 rotates substantially translationally downward to the end of the vertical stroke of portion 126 in display device 100. At the end of the vertical stroke, portion 126 rotates clockwise slightly and traverses horizontally from award value display 122 to the horizontal center of member 116 as illustrated. The rotational motion of rotators 102, 106 and 110 in combination with the force delivered by stationary member or wheel 116 is converted to a substantially translational motion for the end of portion 126 for much of the time between FIGS. 5 and 6, after which the end of portion 126 rotates about an arc to a position opposite that of FIG. 3.

If the motion of display device 100 were to stop at the instant shown in FIG. 6, the player would not be afforded a winning outcome such as value 124, which may or may not be possible for the game employing display device 100. For example, if the game employing display device 100 is a primary game, where the player can win or lose, the outcome of FIG. 6 would be possible. If the game employing display device 100 is a bonus game, the player in one preferred embodiment obtains at least some value or at least a retry outcome from display device 100, rendering the outcome displayed in FIG. 6 unlikely. The bonus game of the present invention does not have to result in a positive outcome for the player however.

Figure 7:
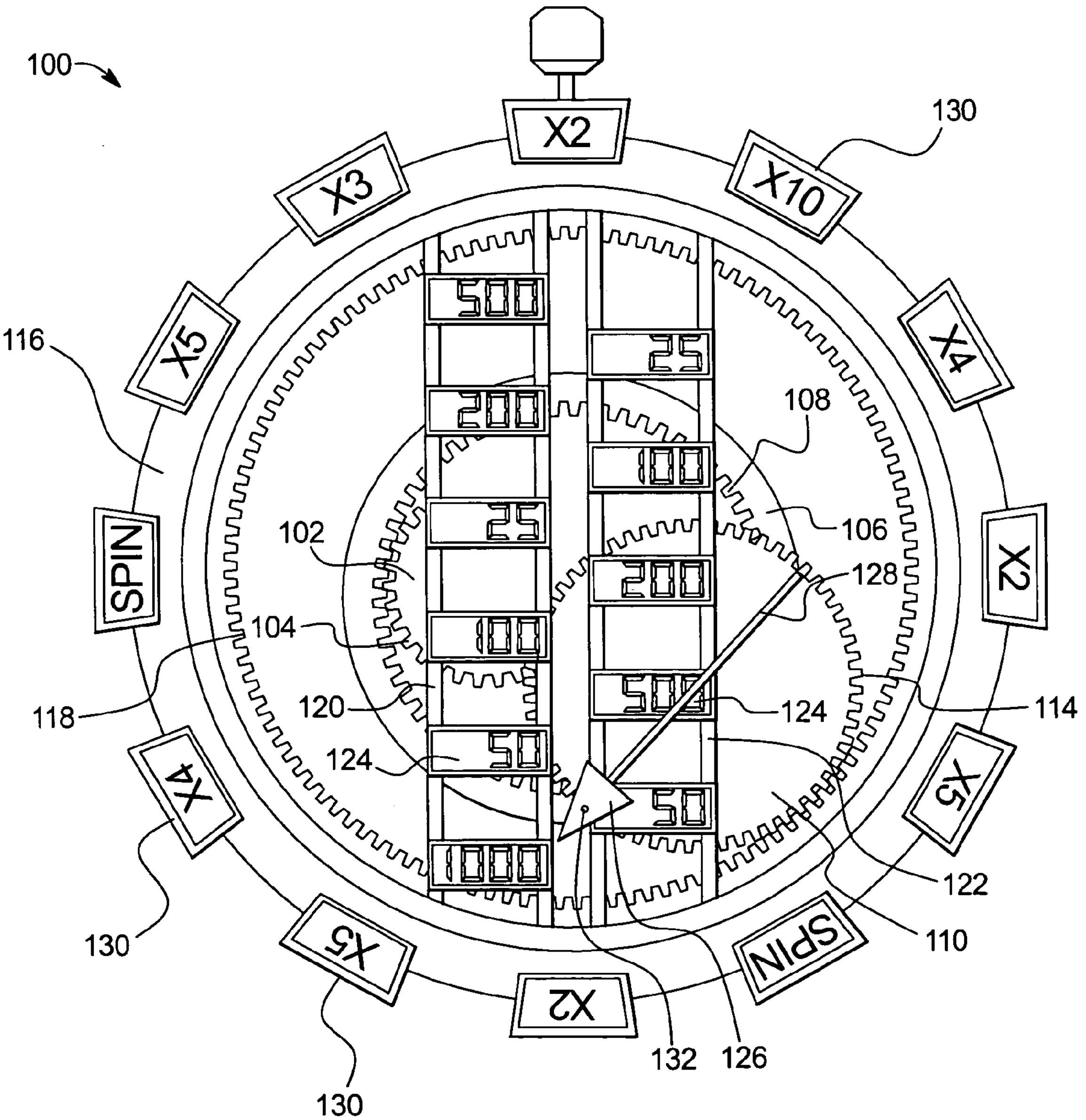

FIG. 7 illustrates indicator 128 and indicating portion thereof 126 in a position moved from the position seen in FIG. 6 after driven indicator 102 has been rotated slightly further in a counterclockwise direction as seen from the orientation of FIG. 7. That slight counterclockwise rotation in turn pulls ring-shaped rotator 106 a slight amount in the same counterclockwise direction. The movement in turn pulls indicating rotator 110 in the same counterclockwise direction a same amount via the connection of ring-shaped or planetary rotator 106 to indicating rotator 110 via pivot 112. At the same time, indicating rotator 110 rotates slightly in a clockwise direction as indicated by indicator 128 and indicating portion 126 thereof. The clockwise rotation is caused by the motion of indicating rotator 110 about the center of ring-shaped rotator 106 and by the engagement of indicating rotator 110 and stationary member 116.

Viewing indicating portion 126 in both FIGS. 6 and 7, the arrowhead or indicating portion 126 rotates horizontally slightly from the lower center position in FIG. 6 to touch or cover a portion of left indicating structure 120. The majority of the motion, however, is translationally upward. As indicating rotator 110 continues rotation from FIGS. 6 and 7, an arc is struck by head 126 until reaching the portion of left award value structure 120. Thereafter, head 126 moves substantially straight upward to, as seen in FIG. 7, to a point between values 124 of one thousand fifty. As above, the motion of display device 100 may or may not terminate between values 124, e.g., in non-value yielding positions.

Figure 8:
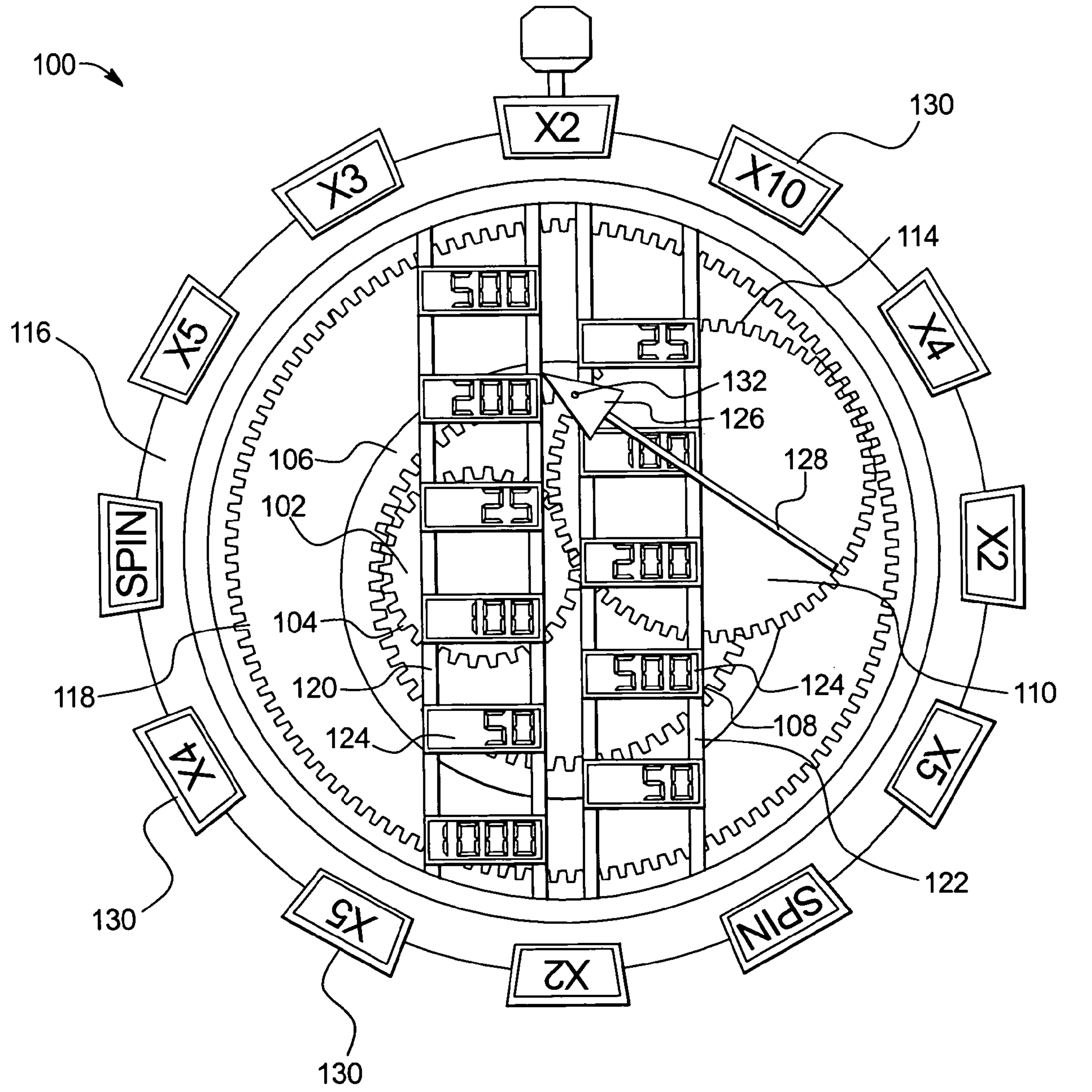
Figure 9:
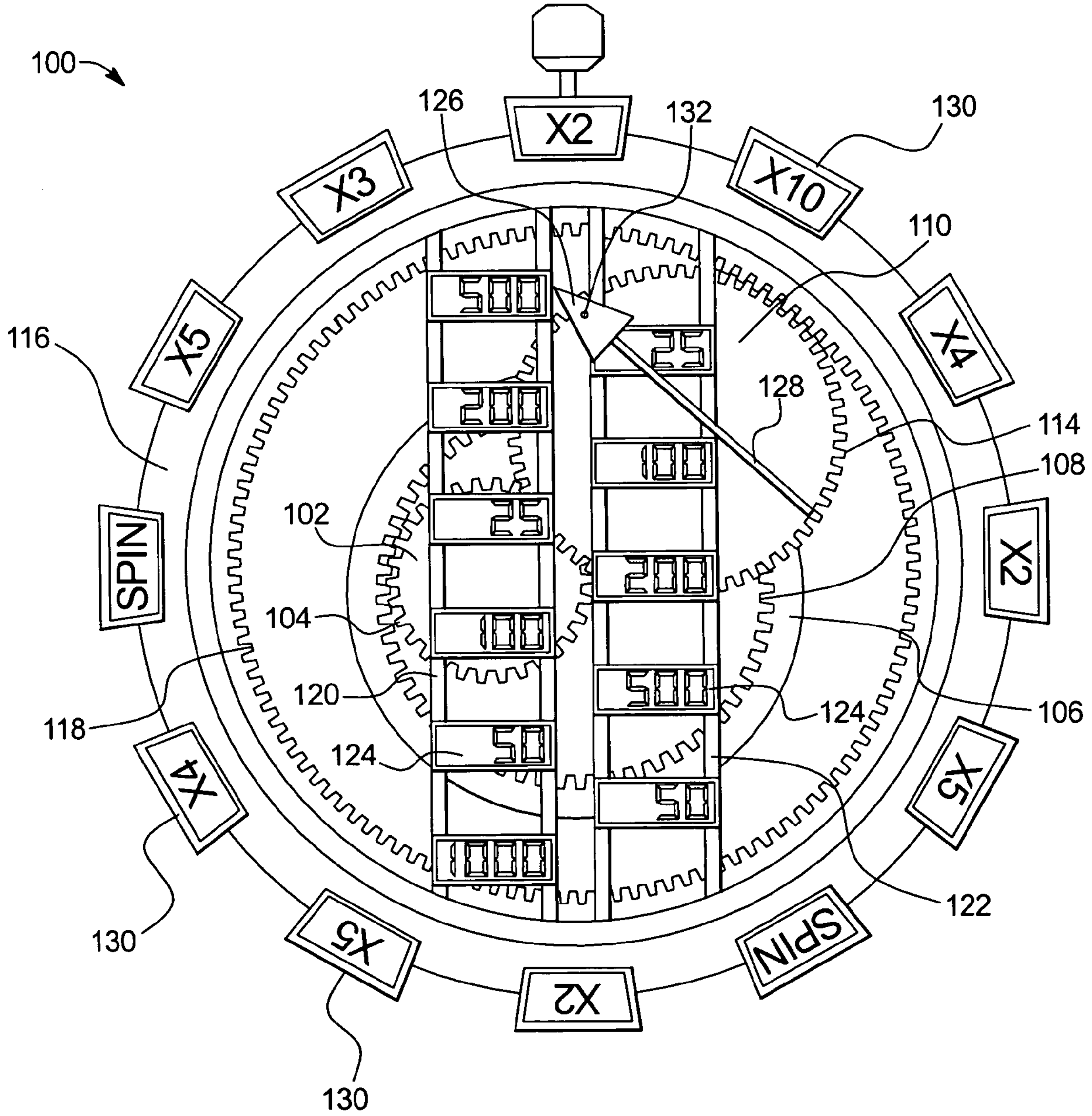

FIGS. 8 and 9 illustrate indicator 128 and indicating portion thereof 126 in a position moved from the position seen in FIG. 7 after driven indicator 102 has been rotated slightly further in a counterclockwise direction as seen from the orientation of FIGS. 8 and 9. Those counterclockwise rotations in turn pull ring-shaped or planetary rotator 106 a slight amount in the same counterclockwise direction. The movements in turn pull indicating rotator 110 in the same counterclockwise direction a same amount via the connection of second ring-shaped rotator 106 to indicating rotator 110 via pivot 112. At the same time, indicating rotator 110 rotates slightly in a clockwise direction as indicated by indicator 128 and indicating portion 126 thereof. The clockwise rotation is caused by the motion of third indicating rotator 110 about the center of ring-shaped or planetary rotator 106 and by the engagement of indicating rotator 110 and stationary member 116.

Viewing indicating portion 126 from FIG. 7 to FIGS. 8 and 9, the arrowhead or indicating portion 126 rotates substantially translationally upward. That is, the rotational motion of rotators 102, 106 and 110 in combination with the force delivered by stationary member or wheel 116 is converted to a substantially translational motion for the endpoint of head 126 between FIGS. 7 to 9. If the motion of display device 100 were to stop at the instant shown in FIG. 8, the player could be awarded two hundred credits or an award based on the value of two hundred, e.g., multiplied by a multiplier value 130. If the motion of display device 100 were to stop at the instant shown in FIG. 9, the player could be awarded five hundred credits or an award based on the value of five hundred, e.g., multiplied by a multiplier value 130.

Figure 10:
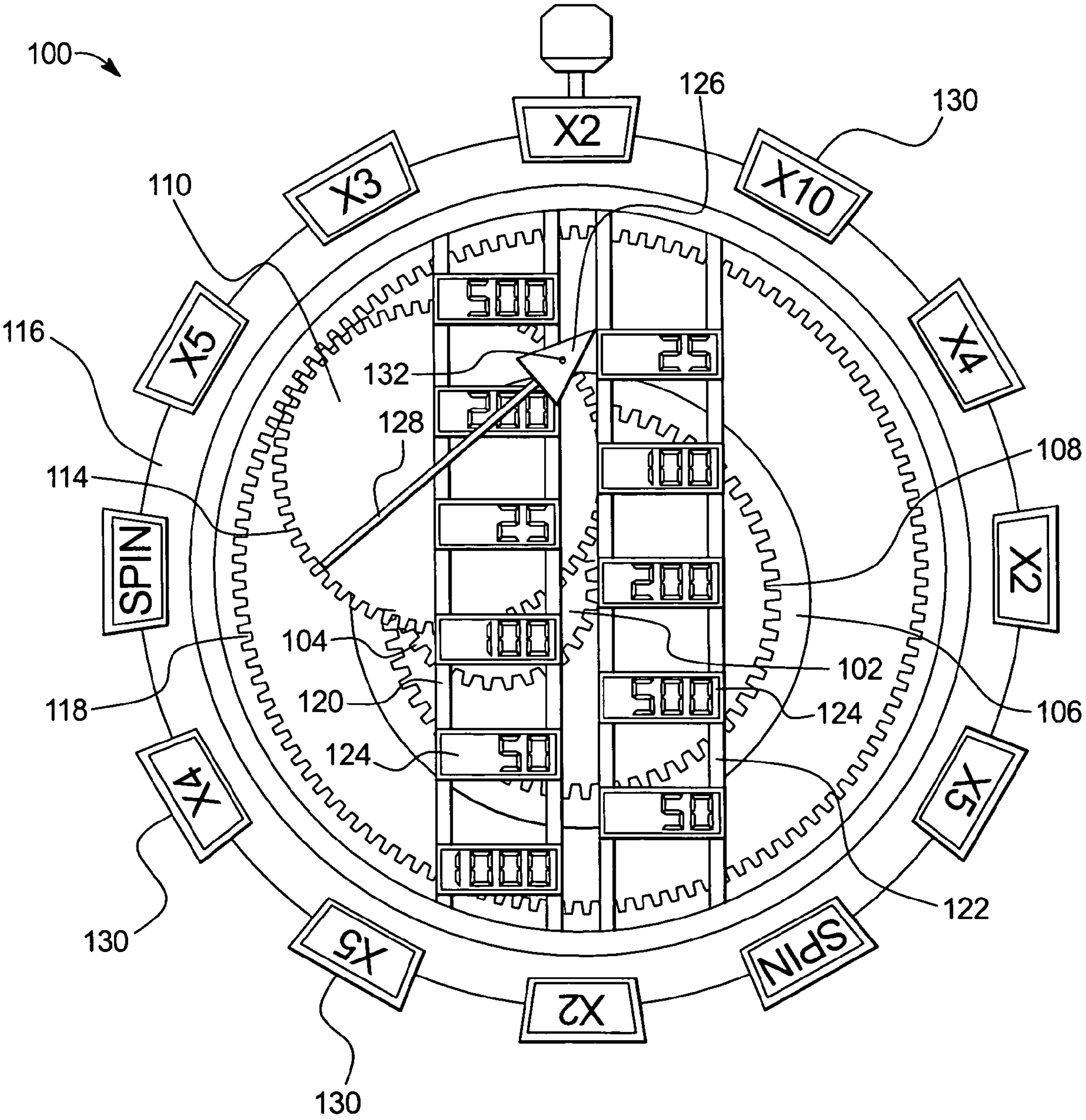

FIG. 10 illustrates that head 126 of indicator 128 has rotated from left value structure 120, around the top of the stroke of display device 100, and is beginning to return down translationally along value structure 122 for a second pass. The position of rotators 102, 106 and 110 is similar to that seen in FIG. 4, which shows that each of the rotators 102, 106 and 110 moves through a repeated cycle as does indicator 128 and associated head 126.

The path created by head 126 in FIGS. 3 to 10 is generally that of an elongated, vertical clockwise loop. The loop can be made longer or shorter, depending on the distance of head 126 from pivot 112. In the illustrated embodiments, that distance is set so that head 126 resides closely adjacent to values 124 of structures 120 and 122. Alternatively, that distance is increased or decreased as desired, for example, increased so that head 126 covers values 124 as the head passes over structures 120 and 122. In such a case, head 126 can include a window or opening so that the player can see the indicated values as indicator 128 traverses through its motion. The loop made by head 126 can be substantially vertical as illustrated, substantially horizontal or be set at any desired angle with respect to the center of member or wheel 116.

Referring now to FIG. 11, an exploded perspective view further illustrates the interconnection of rotators 102, 106 and 110 and motion producing device 58. Motion producing device 58 can be directly coupled to driven rotator 102 as illustrated or be coupled via a reducing gear, timing belt, etc. Although not illustrated, a suitable coupler can be provided to allow for slight misalignment between driven rotator 102 and motor 58 or motion producing device. Motion producing device 58 is coupled to a motion controller 56 as illustrated. Motion producing device 58 and controller cooperate to produce a motion control scheme that moves the components of display device 100 at constant or varying linear and angular accelerations, velocities, distances and directions as desired by the game implementer.

Controller 56 can store multiple programs and recall one of the programs randomly so that the player sees a variety of motion outputs when viewing display device 100. In one embodiment, display device 100 generates a particular award value or symbol 124 randomly. Display device 100 runs a sequence during which multiple ones of the values 124 are indicated momentarily before portion 126 of indicator 128 ultimately stops to indicate one of the awards for the player. In that manner, while device 100 is running, the player at various times hopes the indicator 128 stops to provide a large value 124 or continues so as not to provide a smaller value 124, increasing enjoyment and excitement.

Figure 12:
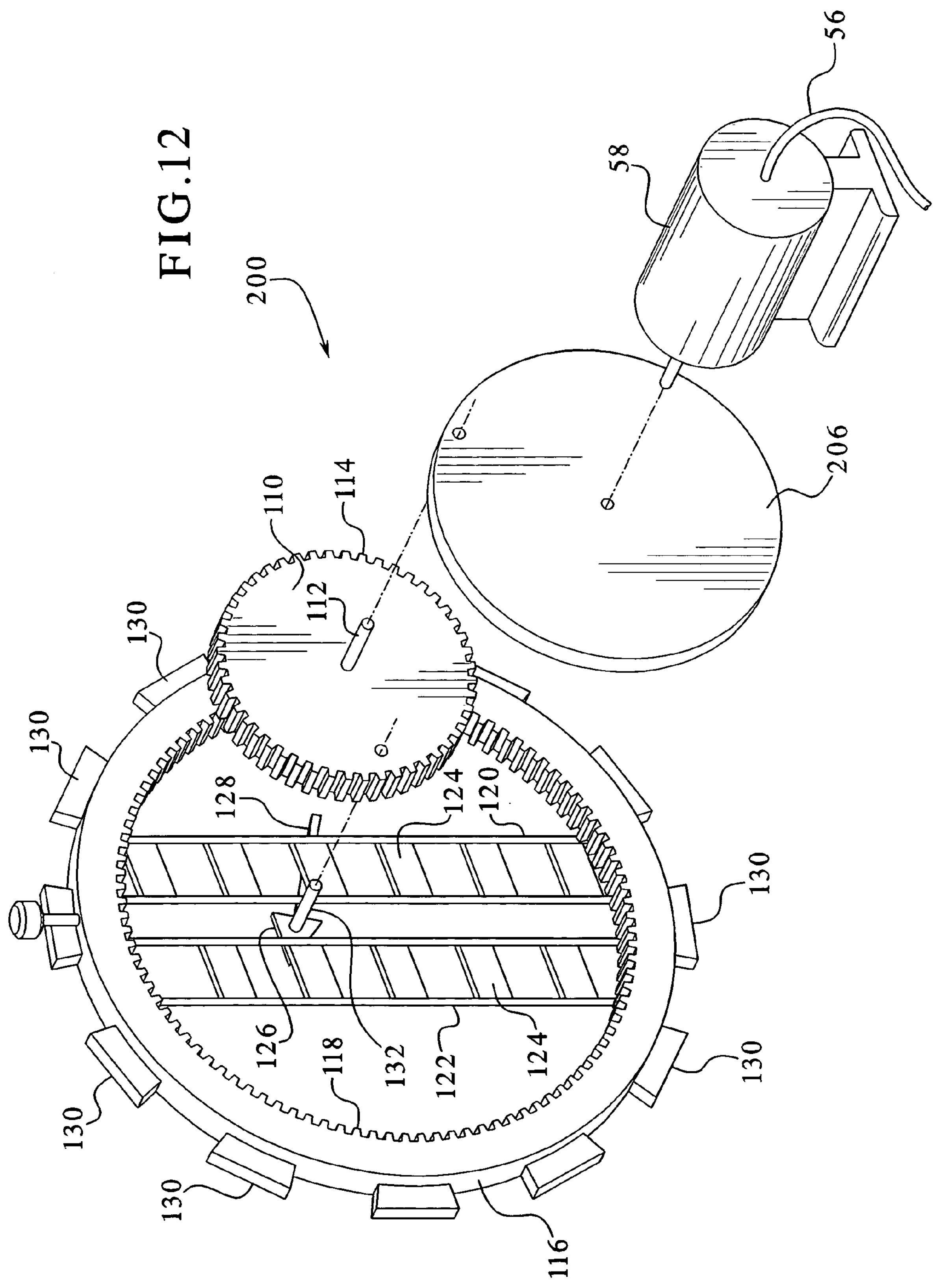
FIG. 12 is an exploded perspective view illustrating an interlocking relationship between an alternative driven rotator and the indicating rotator of the present invention.

Referring now to FIG. 12, an exploded perspective view of an alternative display device 200 illustrates the interconnection of an alternative rotator 206, which combines the functionality of previous rotators 102 and 106. Alternative rotator 206 eliminates the need for separate rotators or gears 102 and 106 and associated gear teeth 104 and 108. Alternative rotator 206 is coupled to indicating rotator 110 in the same manner as is ring-shaped or planetary rotator 106 in FIG. 11, namely, via pivot 112. Pivot 112, as in FIG. 11, is offset radially from the connection of alternative rotator 206 to the shaft of motion producing device 58. Motion producing device 58 can be directly coupled to driven alternative rotator 206 as illustrated or be coupled via a reducing gear, timing belt, etc. Although not illustrated, a suitable coupler can be provided to allow for slight misalignment between driven alternative rotator 206 and motor or motion producing device 58.

Motion producing device 58 is coupled to a motion controller 56 as illustrated. Motion producing device 58 and controller 56 cooperate to produce a motion control scheme that moves the components of display device 200 at constant or varying linear and angular accelerations, velocities, distances and directions as desired by the game implementer.

The coupling of alternative rotator 206 to motion producing device 58 in one embodiment is substantial enough to hold alternative rotator 206 in place. In such case, a separate housing is not used. Alternatively, a separate housing is provided, which houses alternative rotator 206, holding rotator 206 in place in three dimensions, while allowing rotator 206 via suitable ball or roller bearings to rotate within the housing. In a further alternative embodiment, a separate shaft (not illustrated) extends through rotator 206 and is coupled to the shaft of motion producing device 58 via a suitable coupler. The shaft extending through rotator 206 is coupled rotatably via suitable bearings and pillow blocks to the frame or other mounting structure of gaming device 10. That mounting holds rotator 206, indicating rotator 110 and indicator 128 rotatably in place. Indicating rotator 110 is also confined by stationary member or wheel 116.

It should be understood that various changes and modifications to the embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device under control of a processor, the gaming device comprising:

a game operable upon a wager by a player;

a display device controlled by the processor and including:

a driven rotator positioned inside of and driving a planetary rotator, an indicating rotator coupled to and rotating with the planetary rotator, a stationary member extending around and contacting the indicating rotator, and an indicator coupled to the indicating rotator;

a motion producing device controlled by the processor to (i) rotate the driven rotator, (ii) cause the planetary rotator to be rotated by the driven rotator, and (iii) cause the indicating rotator to be moved by the planetary rotator, wherein the stationary member enables rotation of the indicating rotator as the indicating rotator is moved by the planetary rotator, resulting in the indicator having an end that (i) is translatable relative to a plurality of symbols, and (ii) is stoppable to indicate one of the symbols.

2. The gaming device of claim 1, wherein the rotators are selected from the group consisting of: gears and friction wheels.

3. The gaming device of claim 1, wherein the game is a base game and the display device and indicator are part of a bonus game initiated after the base game.

4. The gaming device of claim 3, wherein the base game is selected from the group consisting of: slot, poker, keno, blackjack, craps, bingo, checkers, bunco and any combination thereof.

5. The gaming device of claim 1, wherein the symbols are selected from the group consisting of: game credits, game credit multipliers, a number of free spins, a number of free games, a number of picks from a prize pool, a non-monetary award and any combination thereof.

6. The gaming device of claim 1, wherein the display device displays an outcome for the player, the outcome being a combination of the symbol indicated by the indicator and a second symbol generated in connection with the display device.

7. The gaming device of claim 6, wherein the second symbol is selected from the group consisting of: game credits, game credit multipliers, a number of free spins, a number of free games, a number of picks from a prize pool, a non-monetary award and any combination thereof.

8. The gaming device of claim 1, wherein the display device includes a video monitor and the indicator and rotators are simulated.

9. The gaming devices of claim 1, wherein the motion producing device includes a stepper motor operated via a motion control program under control of the processor.

10. The gaming device of claim 1, wherein the symbols are displayed in at least one line and the end of the indicator travels in at least a substantially parallel manner adjacent to the line of the symbols.

11. The gaming device of claim 1, wherein the symbols are displayed in substantially parallel lines and the end of the indicator is operable to travel in at least a substantially parallel manner in a first direction across a first one of the lines of symbols and in a second direction across a second one of the lines of symbols.

12. The gaming device of claim 11, wherein the end of the indicator travels in an arc between the first and second directions.

13. A gaming device controlled by a processor, said gaming device comprising:

a game controlled by the processor and operable upon a wager by a player;

a cabinet housing the game;

a display device supported by the cabinet and operable with the processor to display a plurality of outcomes and an indicator, said indicator including an indicating portion operable to translate relative to the outcomes due to a rotation of a plurality of interlocking interacting rotators, wherein one of the rotators rotates around a center of rotation of another one of the rotators, and wherein the indicating portion stops translating to indicate one of the outcomes.

14. The gaming device of claim 13, wherein the rotators are selected from the group consisting of: gears and friction wheels.

15. The gaming device of claim 13, wherein the game is a base game and the display device and indicator are part of a bonus game initialed after the base game.

16. The gaming device of claim 15, wherein the base game is selected from the group consisting of: slot, poker, keno, blackjack, craps, bingo, checkers, bunco and any combination thereof.

17. The gaming device of claim 13, wherein the outcomes are of a type selected from the group consisting of: game credits, game credit multipliers, a number of free spins, a number of free games, a number of picks from a prize pool, a non-monetary award and any combination thereof.

18. The gaming device of claim 13, wherein the display device forms an award for the player, the award being a combination of the outcome indicated by the indicator and a second outcome generated in connection with the display device.

19. The gaming device of claim 18, wherein the second outcome is of a type selected from the group consisting of: game credits, game credit multipliers, a number of free spins, a number of free games, a number of picks from a prize pool, a non-monetary award and any combination thereof.

20. The gaming device of claim 13, wherein the display device includes a video monitor and the indicator and rotators are simulated.

21. The gaming device of claim 13, which includes a motor coupled to a driven rotator to rotate a second rotator, the second rotator causing a third rotator to rotate, the indicator fixed to and rotating with the third rotator.

22. The gaming device of claim 21, wherein the third rotator is caused to rotate by the second rotator and by a mechanical engagement with a stationary ring.

23. The gaming device of claim 21, wherein the driven rotator is disk-shaped and the second rotator is ring-shaped, and wherein an outer surface of the disk-shaped driven rotator is coupled to an inner surface of the ring-shaped second rotator.

24. The gaming device of claim 21, wherein the motor is operable to be run using a motion control program.

25. The gaming device of claim 13, wherein the indicating portion of the indicator is an end of the indicator.

26. The gaming device of claim 13, wherein the outcomes are displayed in at least one line and the indicating portion of the indicator travels in at least a substantially parallel manner adjacent to the line of the outcomes.

27. The gaming device of claim 13, wherein the outcomes are displayed in substantially parallel lines and the indication portion of the indicator is operable to travel in at least a substantially parallel manner in a first direction across a first one of the lines of outcomes and in a second direction across a second one of the lines of outcomes.

28. The gaming device of claim 27, wherein the indicating portion of the indicator traverses between the first and second directions in an arc.

29. A gaming device controlled by a processor, said gaming device comprising:

a game controlled by the processor and operable upon a wager by a player;

a cabinet housing the game; and a display device supported by the cabinet and controlled by the processor, the display device operable to display a plurality of symbols and an indicator, an indicating portion of which is caused to translate relative to the symbols, a motor, a driven gear, a second gear and a third gear, the motor coupled to the driven gear, the driven gear causing the second gear to rotate, the second gear causing the third gear to rotate around an axis of rotation of the second gear, the indicator rotating with the third gear.

30. The gaming device of claim 29, wherein the axis is a first axis, and wherein the third gear is caused to rotate by the second gear and by a mechanical engagement with a fourth stationary gear about a second axis of rotation, the second axis of rotation extending through the third gear.

31. The gaming device of claim 29, wherein the driven gear is disk-shaped and the second gear is ring-shaped, and wherein outer facing teeth of the driven gear engage inward facing teeth of the second gear.

32. The gaming device of claim 29, wherein the axis is a first axis, and wherein the third gear rotates about a second axis, the second axis extending transversely from a side of the second gear.

33. A gaming device controlled by a processor, said gaming device comprising:

a game controlled by the processor operable upon a wager by a player;

a cabinet housing the game; and a display device supported by the cabinet and controlled by the processor, the display device operable to display a plurality of symbols and an indicator, an indicating portion of which is caused to translate relative to the symbols, a driven rotator, a ring-shaped rotator and an indicating rotator, the driven rotator causing the ring-shaped rotator to rotate, the ring-shaped rotator causing the indicating rotator to rotate around an axis of rotation of the ring-shaped rotator, the indicator rotating with the indicating rotator.

34. The gaming device of claim 33, wherein at least one of the rotators is a gear.

35. The gaming device of claim 33, wherein the indicating rotator is caused to rotate by the ring-shaped rotator and by a mechanical engagement with a stationary member.

36. The gaming device of claim 33, wherein the axis is a first axis, and wherein the indicating rotator rotates about a second axis, the second axis extending transversely from a side of the ring-shaped rotator.

37. The gaming device of claim 33, wherein an indicating end of the indicator is attached to the indicating rotator at a desired radial distance from an axis of rotation of the indicating rotator.

38. A gaming device controlled by a processor, said gaming device comprising:

a game controlled by the processor and operable upon a wager by a player;

a cabinet housing the game; and a display device supported by the cabinet and controlled by the processor, the display device operable to display a plurality of symbols and an indicator, an indicating portion of which is caused to translate relative to the symbols, a motor, a driven gear and a second gear, the motor coupled to the driven gear, the driven gear causing the second gear to rotate around an axis of rotation of the driven gear, the indicator rotating with the second gear.

39. The gaming device of claim 38, wherein the axis is a first axis, and wherein the second gear is caused to rotate by the driven gear and by a mechanical engagement with a third stationary gear about a second axis of rotation, the second axis of rotation extending through the second gear.

40. The gaming device of claim 38, wherein at least one of the driven gear and the second gear is disk-shaped.

41. The gaming device of claim 38, wherein the axis is a first axis, and wherein the second gear rotates about a second axis, the second axis extending transversely from a side of the driven gear.

42. A gaming device controlled by a processor, said gaming device comprising:

a game controlled by the processor operable upon a wager by a player;

a cabinet housing the game; and a display device supported by the cabinet and controlled by the processor, the display device operable to display a plurality of symbols and an indicator, an indicating portion of which is caused to translate relative to the symbols, a driven rotator and an indicating rotator, the driven rotator causing the indicating rotator to rotate around an axis of rotation of the driven rotator, the indicator rotating with the indicating rotator.

43. The gaming device of claim 42, wherein at least one of the rotators includes a gear.

44. The gaming device of claim 42, wherein the indicating rotator is caused to rotate by the driven rotator and by a mechanical engagement with a stationary member.

45. The gaming device of claim 42, wherein the axis is a first axis, and wherein the indicating rotator rotates about a second axis, the second axis extending transversely from a side of the driven rotator.

46. The gaming device of claim 42, wherein an indicating end of the indicator is attached to the indicating rotator at a desired radial distance from an axis of rotation of the indicating rotator.

47. A gaming device symbol display method comprising:

rotating a first member to a controlled position;

causing the first member to rotate a second member;

causing the second member to move a third member about an axis of rotation of the second member; and translating an indicator coupled to the third member relative to displayed symbols, wherein one of the symbols is indicated when the first member is rotated to the controlled position.

48. The symbol display method of claim 47, wherein causing the first member to rotate the second member includes causing outwardly facing gear teeth of the first member to turn inwardly facing gear teeth of the second member.

49. The symbol display method of claim 47, wherein causing the first member to rotate the second member includes causing a convex surface of the first member to frictionally engage a concave surface of the second member.

50. The symbol display method of claim 47, wherein causing the second member to move the third member includes carrying the third member about a circumference struck by the rotating second member.

51. The symbol display method of claim 47, wherein causing the second member to move the third member includes turning the third member frictionally against a fourth member.

52. The symbol display method of claim 47, wherein causing the second member to move the third member includes causing outwardly facing gear teeth of the third member to engage inwardly facing gear teeth of a fourth member.

53. The symbol displaying method of claim 47, wherein rotating the first member includes at least one of the following: changing rotation directions at least one time, changing rotational velocity at least one time, changing rotational acceleration at least one time, changing rotational distance traveled from one game play to the next.

54. The symbol displaying method of claim 47, wherein translating the indicator includes at least one of the following: changing rotation directions at least one time, changing translational velocity at least one time, changing translational acceleration at least one time, changing translational distance traveled from one game play to the next.

55. The symbol displaying method of claim 47, which includes the step of providing an award to a player based on the ward value indicated when the first member is rotated to the controlled position.

56. A gaming device symbol display method comprising:

displaying a plurality of symbols in front of a mechanical linkage behind the displayed symbols;

moving an indicator in front of the symbols, wherein the indicator is connected to the linkage such that the indicator moves translationally and rotationally to indicate at different times various ones of the plurality of symbols;

stopping the indicator to indicate one of the symbols; and providing an outcome to a player based on the indicated symbol.

57. The gaming device symbol display method of claim 56, which includes displaying the symbols in at least two groups.

58. The gaming device symbol display method of claim 56, wherein the indicator includes a first end and a second end and which includes connecting the linkage to the indicator at one of the first and second ends.

59. The gaming device symbol display method of claim 56, which includes displaying at least a portion of the linkage.

* * * * *

UNITED STATES PATENT AND TRADEMARK OFFICE

CERTIFICATE OF CORRECTION

| | | |
|---|---|---|
| PATENT NO. | : 7,614,952 B2 | Page 1 of 1 |
| APPLICATION NO. | : 10/956278 | |
| DATED | : November 10, 2009 | |
| INVENTOR(S) | : Hans Elias | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Nineteenth Day of October, 2010

David J. Kappos

*Director of the United States Patent and Trademark Office*